(12) United States Patent
Garrett et al.

(10) Patent No.: US 9,754,626 B1
(45) Date of Patent: Sep. 5, 2017

(54) MOBILE DEVICE VIDEO PERSONALIZATION

(71) Applicant: Meograph, Inc., San Francisco, CA (US)

(72) Inventors: Clayton Garrett, Atlanta, GA (US); Ajmal Kunnummal, Atlanta, GA (US); Michael Leybovich, San Francisco, CA (US)

(73) Assignee: Meograph, Inc., San Francisco, CA (US)

( * ) Notice: Subject to any disclaimer, the term of this patent is extended or adjusted under 35 U.S.C. 154(b) by 0 days.

(21) Appl. No.: 15/446,266

(22) Filed: Mar. 1, 2017

Related U.S. Application Data

(60) Provisional application No. 62/301,891, filed on Mar. 1, 2016.

(51) Int. Cl.
| | | |
|---|---|---|
| *G11B 27/036* | (2006.01) | |
| *H04M 1/725* | (2006.01) | |
| *H04N 5/93* | (2006.01) | |
| *G11B 27/10* | (2006.01) | |
| *H04N 21/472* | (2011.01) | |

(52) U.S. Cl.
CPC .......... *G11B 27/036* (2013.01); *G11B 27/10* (2013.01); *H04M 1/72522* (2013.01); *H04N 5/9305* (2013.01); *H04N 21/47205* (2013.01); *H04M 2203/256* (2013.01)

(58) Field of Classification Search
CPC ..... G11B 27/036; G11B 27/10; G11B 27/326; G11B 27/322; H04N 5/9305; H04N 21/22; H04N 21/47205; H04M 1/72522
See application file for complete search history.

(56) References Cited

U.S. PATENT DOCUMENTS 7,697,787 B2 * 4/2010 Illsley ................. G06T 17/00
382/118

* cited by examiner

*Primary Examiner* — Huy T Nguyen
(74) *Attorney, Agent, or Firm* — Burbage Law, P.C.; Jon-Michael Burbage; Elizabeth Ruzich

(57) ABSTRACT

The disclosure includes embodiments for generating a synched video. A method includes determining a duration and a number of discrete frames of an original video. The method includes determining a type of replacement video that includes a live source or a recorded source. The method includes tracking a location of an original head in the original video to determine positioning data for the original head in each of the discrete frames. The method includes synching the replacement video to the original video based on a position, a size and a rotation between the original head in the original video and a replacement head in the replacement video, wherein the synching generates a synched video which synchs the replacement head to the original head based on the position, the size and the rotation.

20 Claims, 20 Drawing Sheets

MOBILE DEVICE VIDEO PERSONALIZATION

PRIORITY CLAIM

The application claims priority to U.S. Provisional Patent Application No. 62/301,891 filed on Mar. 1, 2016 and entitled "Video Personalization," the entirety of which is hereby incorporated by reference.

BACKGROUND

This specification relates to video personalization. Embodiments relate to providing video personalization for a mobile client device.

A mobile device includes a processor-based computing device. For example, the mobile device includes a smartphone, tablet computing device, a smartwatch, augmented reality glasses, etc. The mobile device includes hardware and software that enables it to record, stream, and/or play back video content. However, there are no good solutions for personalizing video content on a mobile client device that is enjoyable, accurate, and intuitive to use.

SUMMARY

An embodiment of this disclosure is included in the Flippy™ smartphone application published by Meograph of San Francisco, Calif. and distributed in the Apple® App Store.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for generating a synched video by a mobile device, the method including: displaying, by the mobile device, a discover graphical user interface ("GUI") visually depicting an original video which is available for generating the synched video, where at a design time each frame of the original video is pre-processed to identify one or more frames of the original video that include a main subject, where the pre-processing includes identifying a head-shaped region in each frame of the original video that includes an original head of the main subject, where the original video includes a plurality of frames and the original head varies by one or more of placement, rotation and size from frame-to-frame within plurality of frames of the original video and the pre-processing modifies the original video so that the head-shaped region varies from frame-to-frame within the plurality of frames to match the frame-to-frame variation of the original head within the plurality of frames for one or more of placement, rotation and size; displaying, by the mobile device, a practice GUI visually depicting the original video with the original head entirely removed from the head-shaped region and replaced by a live video stream recorded by a camera of the mobile device, where the live video stream is displayed in the head-shaped region of the original video and visually depicts a replacement head of the user, where the practice GUI plays the original video on a loop which ends when a user of the mobile device provides an input to the mobile device triggering the loop to end; displaying, by the mobile device, a recording GUI visually depicting the original video with the original head entirely removed from the head-shaped region and replaced by the live video stream which is displayed in the head-shaped region of the original video and visually depicts the replacement head, where the recording GUI plays the original video once during the recording mode and the live video stream is recorded to generate a replacement video that includes the live stream video displayed in the head-shaped region of the recording GUI and not the practice GUI; and omni-synching the original video and the replacement video to generate the synched video, where the synched video visually depicts the plurality of frames of the original video with the original head is replaced by the replacement video which visually depicts the replacement head so that the synched video visually depicts the replacement head as a replacement for the original head, where the replacement head visually depicted in the synched video varies from frame-to-frame within the plurality of frames to match the frame-to-frame variation of the original head within the plurality of frames of the original video for one or more of placement, rotation and size. Other embodiments of this aspect include corresponding computer systems, apparatus, and computer programs recorded on one or more computer storage devices, each configured to perform the actions of the methods.

One general aspect includes a method for generating a synched video, the method including: displaying, by an electronic display, a discover GUI visually depicting an original video which is available for generating the synched video, where each frame of the original video is analyzed to identify one or more frames of the original video that include a main subject having an original head, where the analysis includes identifying a head-shaped region in each frame of the original video that includes the original head, where the original video includes a plurality of frames and the original head varies by one or more of placement, rotation and size from frame-to-frame within plurality of frames of the original video and the analyzes modifies the original video so that the head-shaped region varies from frame-to-frame within the plurality of frames to match the frame-to-frame variation of the original head within the plurality of frames for one or more of placement, rotation and size; displaying, by the electronic display, a recording GUI visually depicting the original video with the original head removed from the head-shaped region and replaced by a video stream which is displayed in the head-shaped region of the original video, where the video stream visually depicts a replacement head, where the video stream is recorded during a playback of the original video to generate a replacement video that includes the live stream video displayed in the head-shaped region of the recording GUI; and omni-synching the original video and the replacement video to form a synched video, where the synched video visually depicts the plurality of frames of the original video with the original head is replaced by the replacement video which visually depicts the replacement head so that the synched video visually depicts the replacement head as a replacement for the original head, where the replacement head visually depicted in the synched video varies from frame-to-frame within the plurality of frames to match the frame-to-frame variation of the original head within the plurality of frames of the original video for one or more of placement, rotation and size. The video stream may be: (1) a live video stream (e.g., recorded by a device such as a mobile device or some other processor-based computing device including a camera and video recording capabilities); or (2) a previously recorded video which is retrieved from a non-transitory memory. Other embodiments of this aspect include corresponding computer systems, apparatus, and computer programs recorded on one or more computer storage devices, each configured to perform the actions of the methods.

Implementations may include one or more of the following features. The method where the electronic display is an element of a smartphone. The method where the electronic display is not an element of a smartphone. The method where the original video is recorded by a pair of augmented reality glasses that include a processor and a camera for generating the recorded video. The method where the original video if of a type selected from a group that includes: a movie; a music video; an episode of a televisual program; virtual reality video content; and augmented reality video content. The method where the replacement video is not live stream video content and is instead pre-recorded video content. The method where the replacement video is retrieved from a non-transitory memory. The method where the original video is streamed from a video server via a wireless network. The method where the replacement video is recorded by a camera of a mobile device that executes the steps of the method and includes the electronic display. The method where the replacement video is not wirelessly streamed via a network. The method where the steps of the method are executed by a processor responsive to the processor executing software that is operable to cause the processor to execute the steps of the method. The method further including a first user sharing the synched video with a second user via an electronic image messaging service. The method where the electronic image messaging service is operable so that the synched video is viewable by the second user for a limited amount of time before the synched video becomes inaccessible to the second user. Implementations of the described techniques may include hardware, a method or process, or computer software on a computer-accessible medium.

One general aspect includes a method for generating a synched video, the method including: determining a duration and a number of discrete frames of an original video; determining a type of replacement video that includes a live source or a recorded source; tracking a location of an original head in the original video to determine positioning data for the original head in each of the discrete frames; and synching the replacement video to the original video based on a position, a size and a rotation between the original head in the original video and a replacement head in the replacement video, where the synching generates a synched video which synchs the replacement head to the original head based on the position, the size and the rotation. Other embodiments of this aspect include corresponding computer systems, apparatus, and computer programs recorded on one or more computer storage devices, each configured to perform the actions of the methods.

Implementations may include one or more of the following features. The method where responsive to the replacement video being from the live source, determining a number of live frames of the replacement video delivered during a playback loop of the original video. The method where responsive to the replacement video being from the recorded source, determining a number of discrete frames and a timestamp associated with each discrete frame. The method where the replacement video is captured on a mobile device. The method where a creator of the replacement video positions a camera in such a way that replacement image or video is positioned within a head-shaped region included in the original video and overlaying the original head. The method further including a first user sharing the synched video with a second user via an electronic image messaging service which is operable so that the synched video is viewable by the second user for a limited amount of time before the synched video becomes inaccessible to the second user. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
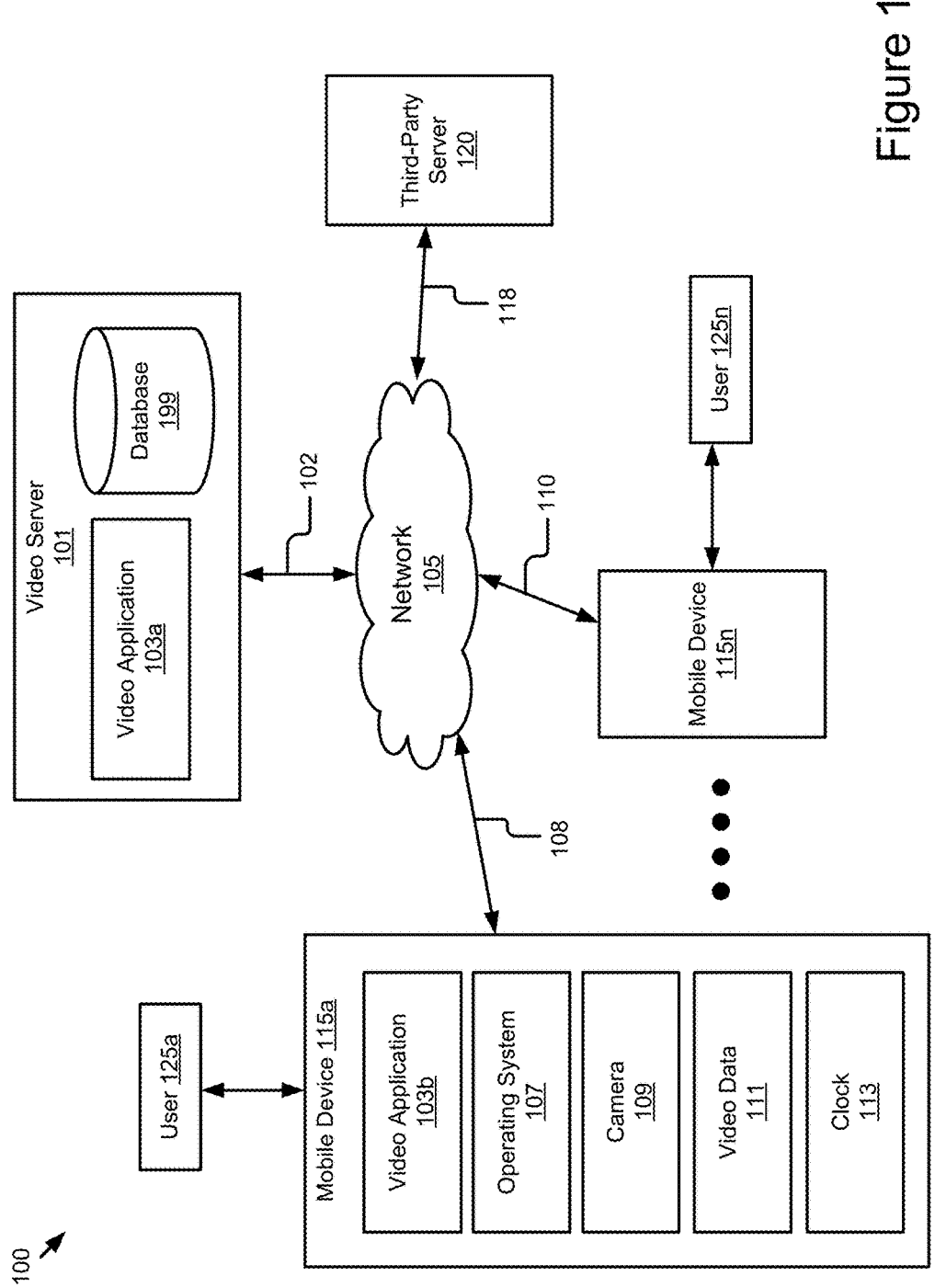
FIG. 1 is a block diagram illustrating an operating environment for a video application and an optimization client according to some embodiments.

This disclosure describes, among other things, embodiments of a video application. An embodiment of the video application is included in the Flippy™ smartphone application published by Meograph of San Francisco, Calif. and distributed in the Apple® App Store. Readers of this disclosure are encouraged to download and use this smartphone application (search term "Flippy—Star in famous clips!") as doing so may assist to better understand the video application described herein.

In the embodiments described herein, the terms "video" and "video clip," as well as plural forms of these terms, can be used interchangeably.

In some embodiments, the video application is an element of a mobile device. The mobile device includes any mobile computing device which includes any hardware or software necessary to record live video content and store this content for subsequent playback. For example, the mobile device may include, among other things, one or more of the following: a smartphone including a camera, video recording functionality and a non-transitory memory for storing the video; a smartwatch including a camera, video recording functionality and a non-transitory memory for storing the video; and a pair of augmented reality glasses including a camera, video recording functionality and a non-transitory memory for storing the video.

Assume that a user is playing with a smartphone that includes the video application. In some embodiments, the video application provides the following example functionality: the video application allows the user to select an original video that includes a main subject; the video application causes the mobile device to record a replacement video of the user which includes the user's head (which is referred to herein as a "replacement head"); the video application generates a new video (which is referred to herein as a "synched video") that overlays the user's head onto a head of the main subject of the original video; and the video application enables the user to share the new video with others via e-mail, an electronic image messaging service, SMS, text messaging, social network applications, etc.

For example, the video application includes a library of original video clips according to some embodiments (there are other sources of original video clips in other embodiments). These original video clips may include, for example, a clip from a famous music video including the "King of Pop." The "King" is the main subject of the clip. Throughout the music video, the "King's" head changes based on the following variables: (1) position; (2) rotation; and (3) size. For example, in the video the "King" sings and dances. As the "King" dances, his head moves to new positions within each frame of the video. The "King's" dancing causes him to gyrate about, which in turn changes the rotation of the "King's" head. The director of the music video has made the artistic choice to zoom in on the "King's" face for some frames, but in other frames the "King" is shown in a wide shot which is not zoomed in on the "King's" face.

In some embodiments, the replacement video is a live stream video. In other embodiments, the replacement video is pre-recorded video content which is retrieved from a memory of the smartphone (or some other mobile device).

Continuing with this example, assume that a young girl, who we will call "Ava" in this example, would like to have some fun by using the video application to create a synched video that is based in part on a clip from the music video including the "King" but substitutes her head for the "King's" head while also accounting for variables such as placement, rotation and size. The video application provides this functionality.

Figure 5:
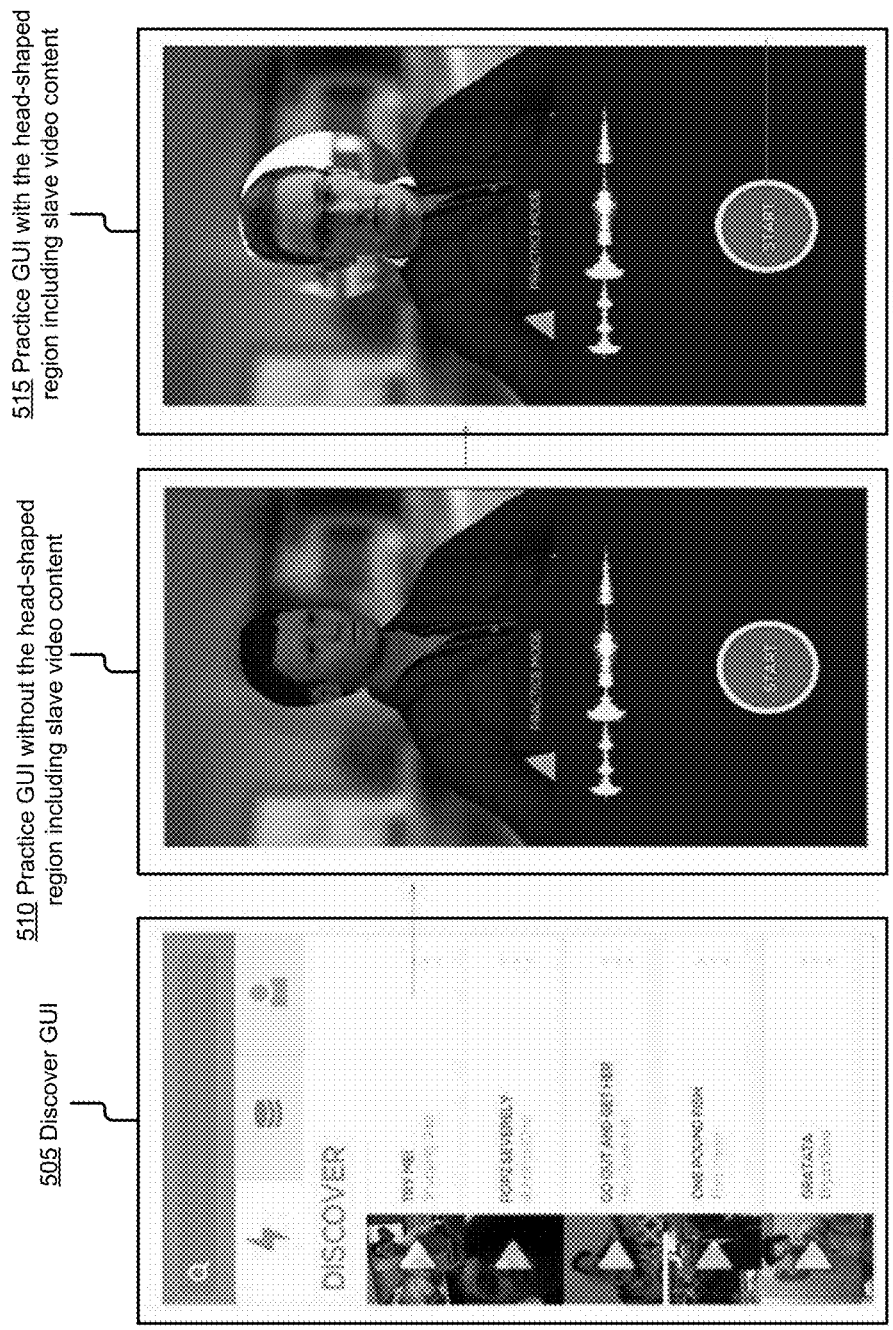
FIGS. 5A-5C and 6A-6C depict example graphical user interfaces generated by the video application and configured to enable a user of a mobile device to provide inputs to the video application for generating a synched video personalized for the user according to some embodiments.

For example, Ava opens the video application on her smartphone. Ava uses a GUI displayed by the video application on her smartphone (this particular GUI is referred to herein as a "discover GUI") to navigate through a library of video clips, some of which may include clips from music videos (see, e.g., FIG. 5A for an example of the discover GUI). Ava selects the clip from the famous music video including the "King" from the video library included in the video application. The smartphone includes a front-facing camera (which is sometimes referred to as a "selfie" camera). The process described herein is referred to as the "Discover Mode."

Responsive to receiving the selection from the video library (e.g., Ava touches a touch-sensitive screen of the smartphone to select the clip from the famous music video), the video application generates a "practice GUI" and engages the selfie camera of the smartphone. See, e.g., FIG. 5B for an example of the practice GUI in an initial state. FIG. 5C includes an example of the practice GUI in a different state. In the embodiment depicted in FIG. 5C, the practice GUI includes: (1) a background which includes the original video selected from the video library playing on a loop; and (2) a head-shaped region which depicts live video content captured by the selfie camera of the smartphone (or, optionally, the non-selfie camera of the smartphone). In the embodiment depicted in FIG. 5B, the head-shaped region of the practice GUI does not include the slave video content.

In some embodiments, the head-shaped region is only present in the practice GUI when the main subject of the original video is present for the current frame; if the current frame does not include the main subject, then the head-shaped region is not depicted in the GUI. The original video playing in the background of the practice GUI plays automatically after being selected and cycles on a loop during this initial period.

In some embodiments, the original video is pre-processed by the video application at design time (see, e.g., FIG. 7) so that the head-shaped region is known for the original video at run time (e.g. when it is available for selection in the video library) and does not need to be determined on the fly in real-time as users such as Ava are playing with the video application.

An example purpose of the practice GUI is to enable users such as Ava to practice lining up their face in the head-shaped region of the practice GUI. The practice GUI may include the words "Practice Mode" at the bottom of the practice GUI. See, e.g., FIGS. 5B and 5C which each include the words "Practice Mode" at the bottom of the practice GUI.

In some embodiments, since the original video plays on a cycle in the background of the practice GUI and the frames of the video change over time, the user can practice different variables for the different frames of the original video. For example, these variables which are practiced by the user during the "Practice Mode" may include one or more of the following: (1) how the user will rotate their head within the head-shaped region for different frames of the original video; (2) what facial expressions the user will make for different frames of the original video; (3) whether and how the user will lip sing for different frames of the original video; and (4) any other variables which the user wishes to introduce into head-shaped portion of the synched video such as props, gags, etc.

During the original video, the head of the main subject of the original video may change in one or more of the following ways: (1) the head may change its position from frame-to-frame (e.g., move from side to side or up and down); (2) the head may change its rotation from frame-to-frame (e.g., the torso of the main subject may remain substantially the same from frame-to-frame while the head of the main subject changes its orientation from frame-to-frame); and (3) the head may change size from frame-to-frame (e.g., in one frame the head may be smaller, while it in the next frame the head may be larger).

The video application accounts for these modifications during the "Practice Mode" by changing the placement, rotation and size of the head-shaped region of the practice GUI from frame-to-frame to correspond to changes for the head of the main subject. For example, with reference to the original video featuring the "King of Pop," as the "King" dances from side-to-side, both the placement and rotation of the "King's" head in the original video change. This original video also deviates from frame-to-frame with close-up shots of the "King" in one frame transitioning to wide-angle shots that show the "King" from far away while dancing with back-up dancers. The original video is pre-processed by the video application at design time so that the head-shaped region depicted in the practice GUI moves from frame-to-frame with a placement and rotational-orientation that corresponds to the placement and rotation of the "King's" head in the original video on a frame-by-frame basis. See, e.g., FIG. 7 for an example of such pre-processing provided by the video application. This pre-processing includes modifying the size of the head-shaped region to correspond to the size of the subject head in the original video.

During the "Practice Mode" the video application does not record any of the live video content included in the head-shaped region of the practice GUI. The practice GUI includes a graphical button for initiating a recording process in which "Practice Mode" ends and the live video content displayed in the head-shaped region is recorded along with the background which is supplied by the original video. For example, with reference to FIGS. 5B and 5C, the practice GUI depicted in these example embodiments includes a graphical button at the bottom of the practice GUI labeled "START." A user touching this graphical button using a touch-sensitive display of the smartphone corresponds to an input to the video application to start recording.

Responsive to receiving the input to start recording, the video application initiates a "Transition Period" so that the user can prepare to perform for the recording. For example, the video application causes the display of the smartphone to depict a "transition GUI" in which a graphical number "3" is depicted by the countdown GUI, followed by a graphical number "2," which is then followed by the a graphical number "1." Each of these numbers is displayed for approximately one second by the transition GUI. Accordingly, in this example the "Transition Period" lasts approximately three seconds.

Figure 6:
Figure 9:
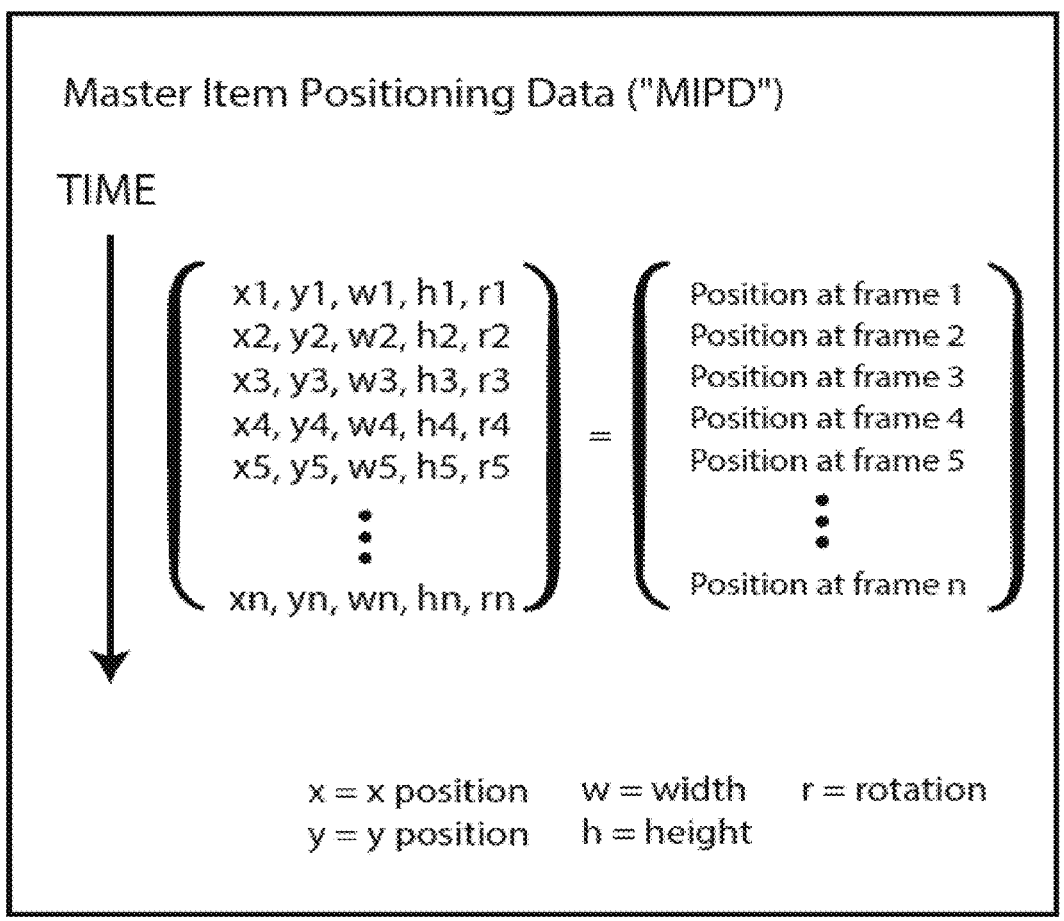
FIG. 9 includes a block diagram illustrating an example of the master item positioning data according to some embodiments.
Figure 10:
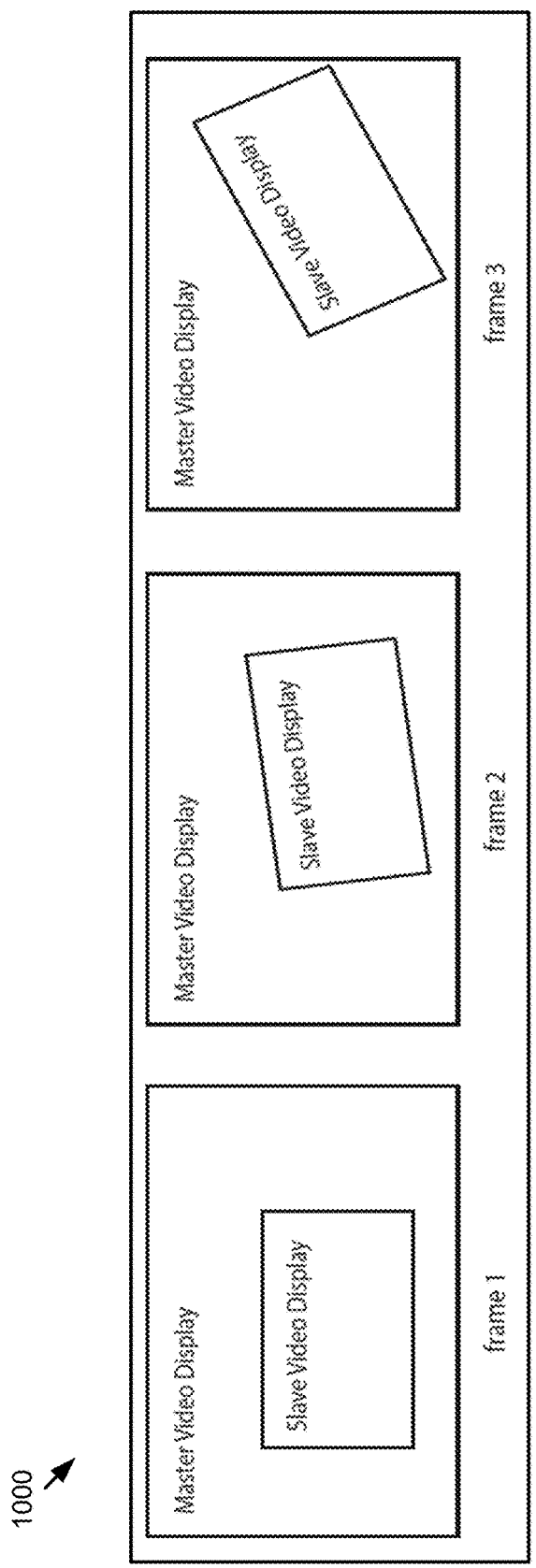
FIG. 10 includes a block diagram illustrating an example process flowchart describing the relationship between a master video and a slave video over the course of a plurality of frames according to some embodiments.
Figure 11:
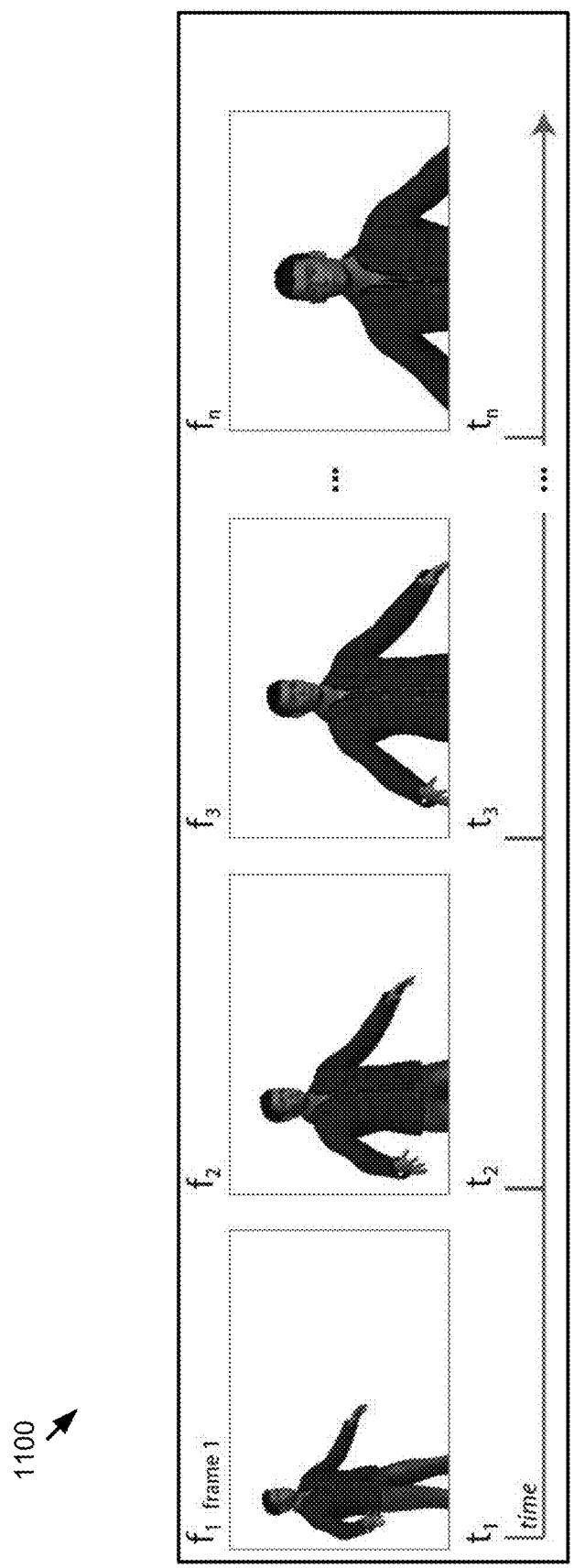
FIG. 11 includes a block diagram illustrating an example process flowchart describing how the video application tracks a position of a video subject's head as it moves as the positioned item within a master video over the course of a plurality of frames of the master video according to some embodiments.
Figure 12:
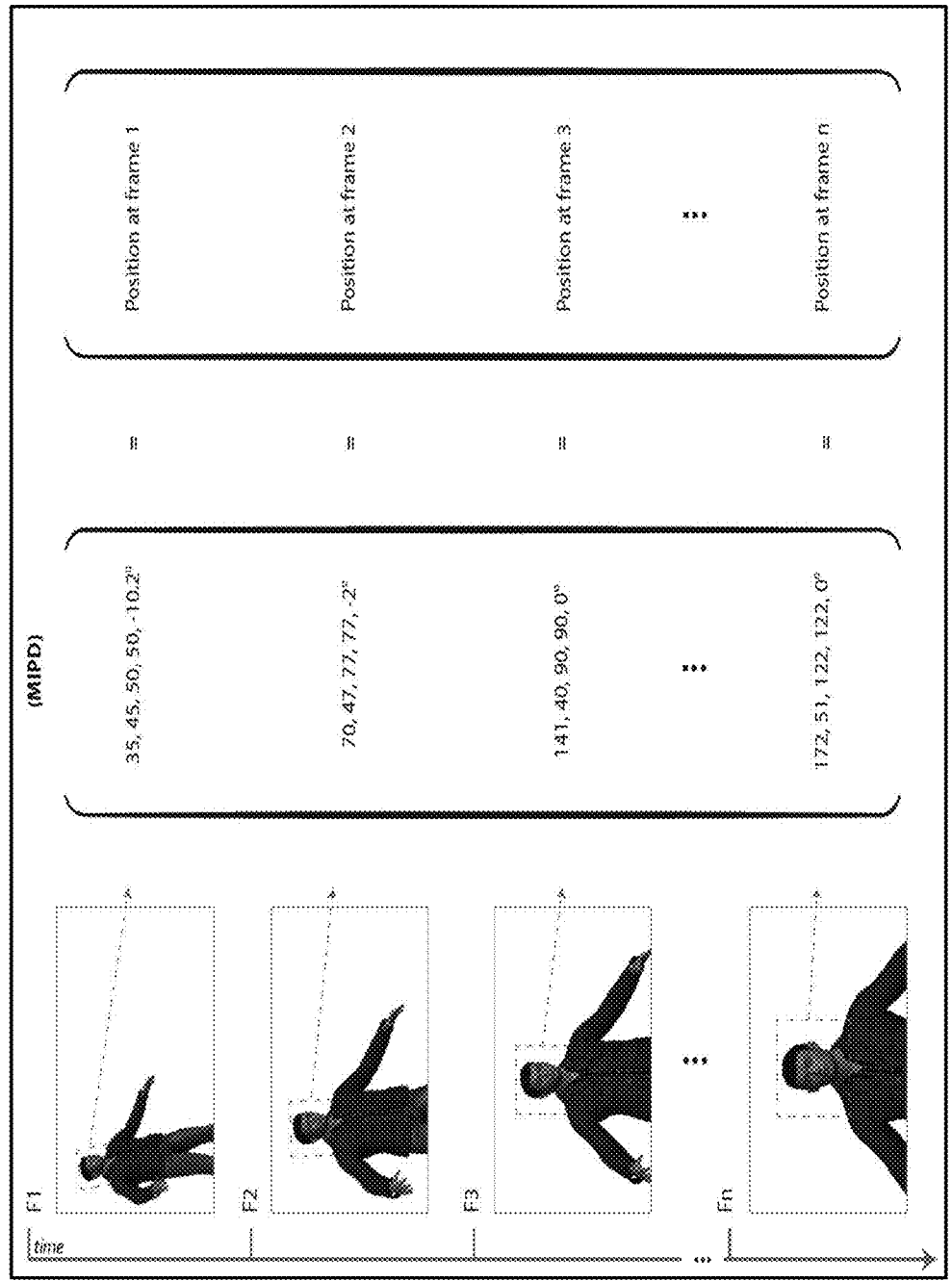
FIG. 12 includes a block diagram illustrating an example process flowchart describing how the video application generates master item positioning data corresponding to the example depicted in FIG. 11 according to some embodiments.

After the transition period ends, the video application causes the display of the smartphone to depict a "recording GUI." See, e.g., FIGS. 6A and 6B. This is referred to herein as the "Recording Mode." The recording GUI is similar to the practice GUI in that it includes: (1) a background which includes the original video selected from the video library; and (2) a head-shaped region which depicts live video content captured by the selfie camera of the smartphone (or, optionally, the non-selfie camera of the smartphone). However, unlike the practice GUI, while displaying the recording GUI the video application (1) does not play the original video on a loop and (2) the video applications saves the live video-content captured by the selfie camera (or the non-selfie camera) to a non-transitory memory. This recording becomes the replacement video. Optionally, the video application also saves timing data describing the timing of the replacement video relative to the timing of the original video so that these two types of video content can be subsequently be omni-synched to form a new video (which may be referred to herein as a "synched video"). An example of the timing data is depicted in FIG. 9 and referred to below as "Master Item Positioning Data" or "MIPD." An example of the video application determining the MIPD is depicted in FIGS. 10-12.

Figure 8A:
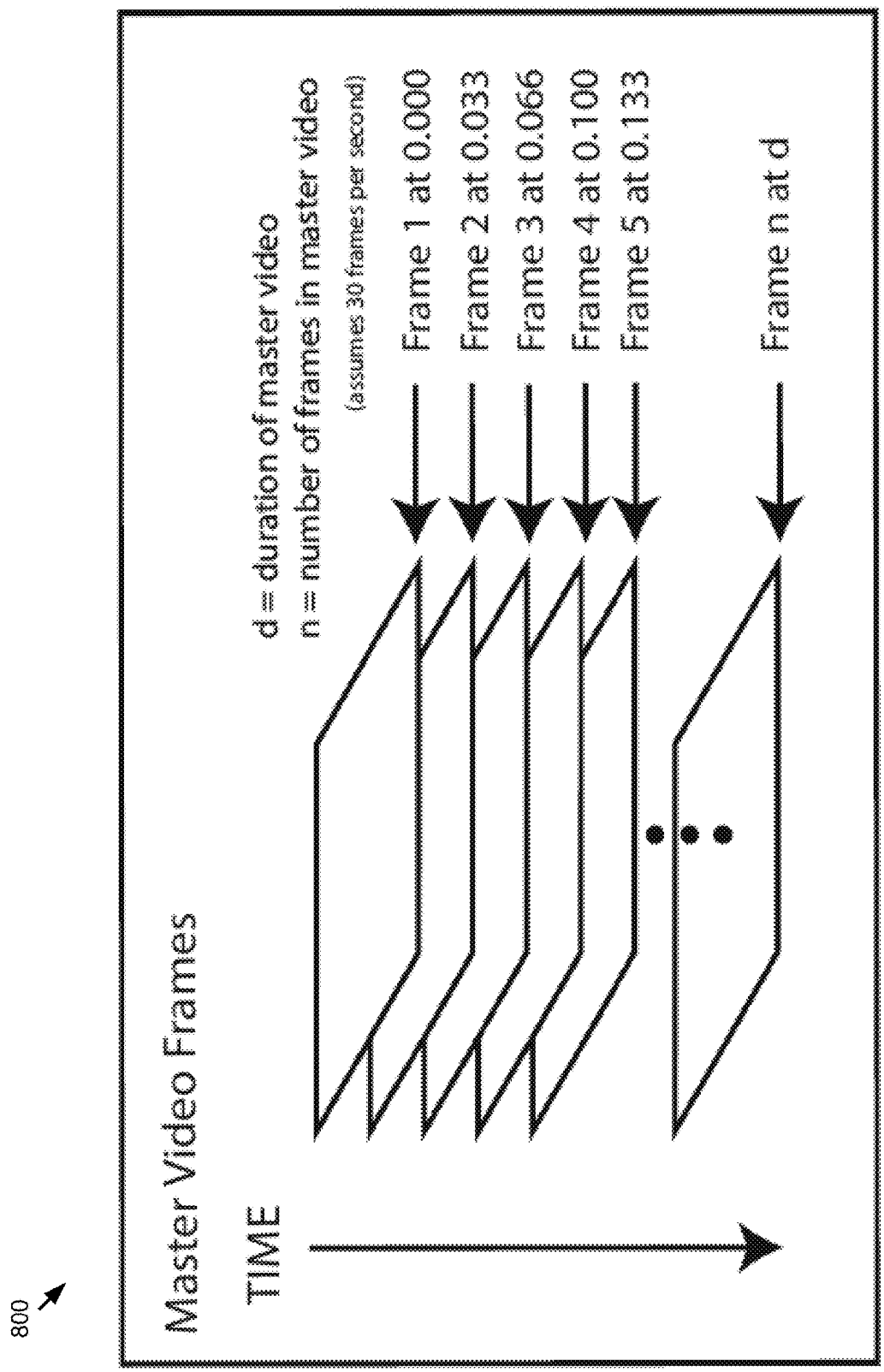
FIG. 8A includes a block diagram illustrating an example frame structure of a master video according to some embodiments.
Figure 8B:
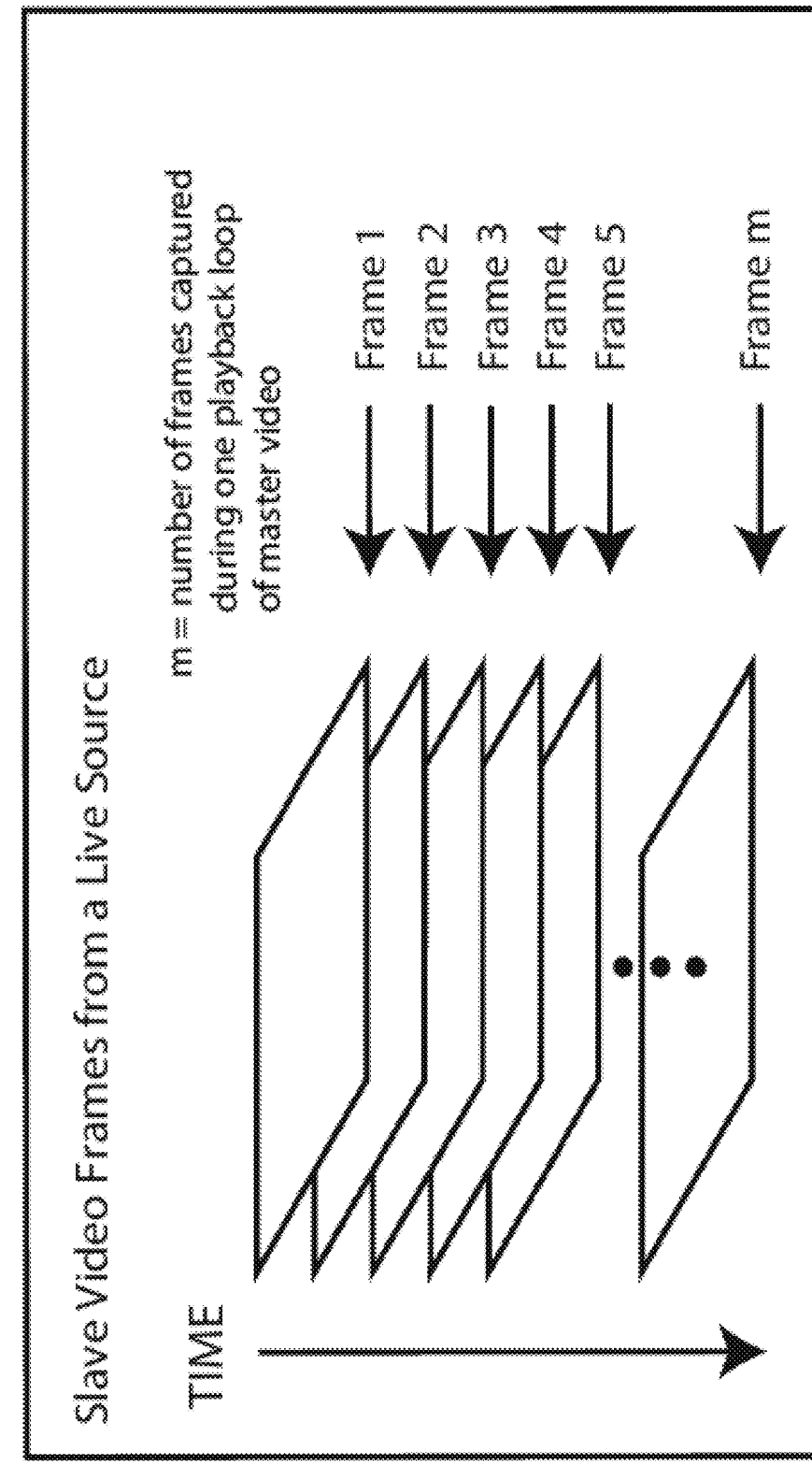
FIG. 8B includes a block diagram illustrating an example frame structure of a slave video from a live source according to some embodiments.
Figure 8C:
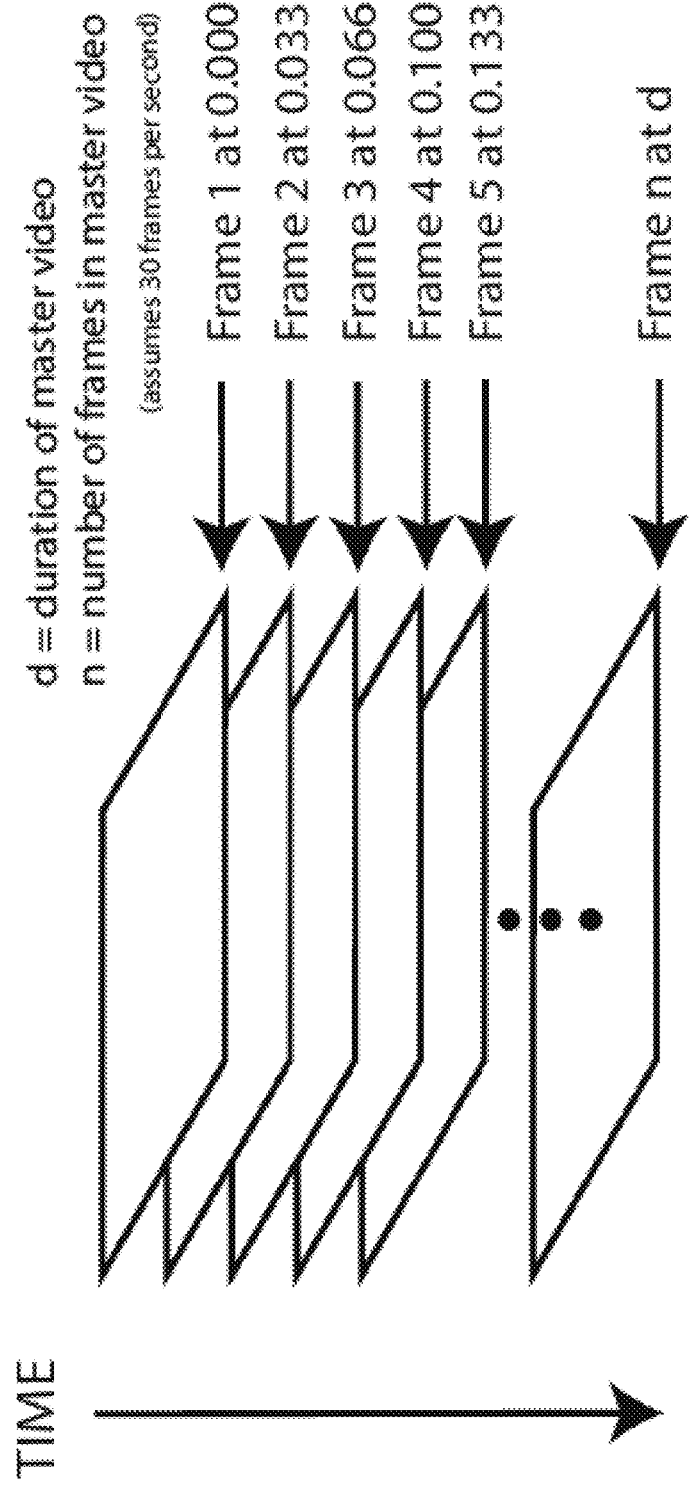
FIG. 8C includes a block diagram illustrating an example frame structure of a slave video from a recorded source according to some embodiments.

An example of the timing data (or MIPD) is depicted according to some embodiments on the right-hand side of FIGS. 8A, 8B and 8C in which example frames and different example time values for a "master video" and a "slave video" are depicted. The master video refers to the original video which is in the background during the Recording Mode and in the synched video and the slave video refers to the video content which is displayed in the head-shaped region of the recording GUI, i.e., the replacement video.

Figure 7:
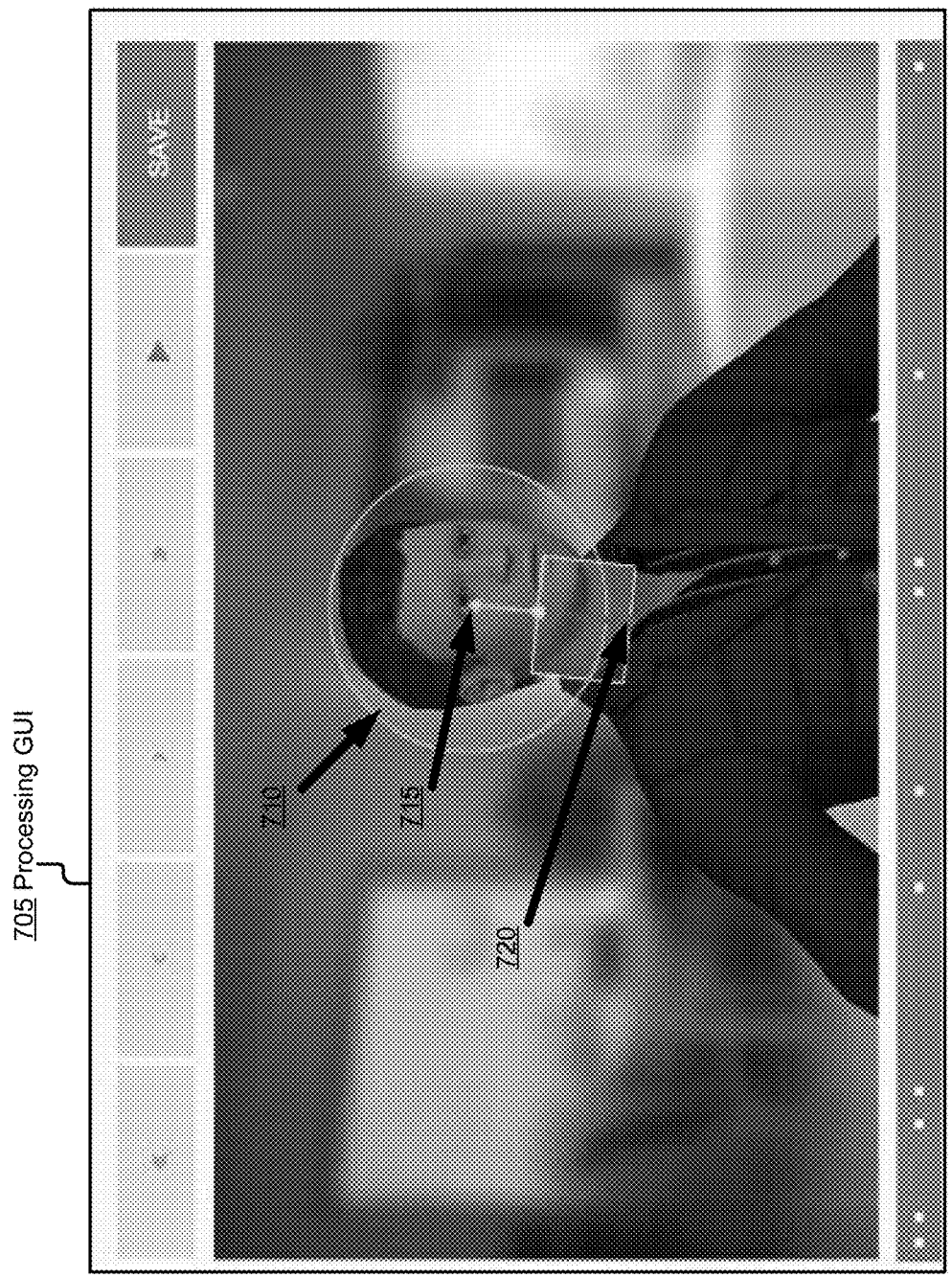
FIG. 7 depicts an example graphical user interface generated by the video application and configured to enable an administrator of a video server to identify a neck point in a frame of an original video which is an element of a synched video according to some embodiments.

Similar to the "Practice Mode," during the "Recording Mode" the head of the main subject of the original video may change from frame-to-frame with regards to one or more of placement, rotation and size. The video application accounts for these changes in the same way it accounts for them during the "Practice Mode." For example, compare the recording GUI depicted in FIG. 6A (which depicts a first frame) to the recording GUI depicted in FIG. 6B (which depicts a second frame immediately following the first fame). Note that in the second frame the head-shaped area has increased in size and changed in orientation relative to the first frame by being tilted down and to the right relative to the first frame. The video application has accounted for this by modifying the size and rotational-orientation of the head-shaped region in the second frame depicted in FIG. 6B. Note that the user does not have to manually tilt his head down and to the right in the second frame relative to the first frame; instead, the video application makes this modification automatically by changing the rotational-orientation of the head-shaped region during pre-processing of the clip from the original video, an example of which is depicted in FIG. 7.

The "Recording Mode" ends when the original video ends (recall, it is not on a loop in the "Recording Mode"). Responsive to the original video ending, the video application begins the "Confirmation Mode" and displays the "confirmation GUI," an example of which is depicted in FIG. 6C. Prior to displaying the confirmation GUI the video application may display a message indicating that processing of the video content is occurring, e.g., to generate the synched video. The confirmation GUI auto-plays the synched video on a loop and includes graphical buttons for the user to either redo the Recording Mode (e.g., the graphical button labeled "REDO" in FIG. 6C) or save the synched video to a non-transitory memory of either the smartphone or a cloud storage service (e.g., the graphical button labeled "SAVE" in FIG. 6C).

In some embodiments, the functionality of the video application is distributed among a cloud server and a mobile device such as a smartphone. For example, the cloud server includes a first video application and the smartphone includes a second video application, and these video applications provide different or complimentary aspects of the functionality of the video application as described below.

In some embodiments, the video application of the cloud server stores the video library (e.g., as a database or some other data structure) and the video application of the cloud server pre-processes the original video clips which are included in the video library.

FIG. 1 illustrates a block diagram of an example operating environment 100 for generating a video. In some embodiments, the video is the synched video described above. The illustrated operating environment 100 includes a video server 101, mobile devices 115a-115n, and a network 105. Users 125a-125n may be associated with respective mobile devices 115a-115n. In some embodiments, the operating environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the operating environment 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the mobile devices 115, the video server 101 and the third-party server 120, in practice one or more networks 105 may be coupled to these entities.

The video server 101 may include a processor, a memory and network communication capabilities. In some embodiments, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi, Bluetooth, or other wireless technology. In some embodiments, the video server 101 sends and receives data to and from one or more of the mobile devices 115a-115n and the third-party server 120 via the network 105. The video server 101 may include a video application 103a and a database 199.

The video application 103a may be code and routines operable to generate or process videos such as those described below with reference to the database 199.

The database 199 may store videos. For example, the database 199 may store one or more original videos that users would like to add their faces, heads or other body features to.

In some embodiments, the original videos may include proprietary video content. For example, the original videos may include Hollywood movies, movies associated with other film industries, music videos, episodes of televisual programs, virtual reality video content, augmented reality video content or some other form of proprietary video content.

In some embodiments, one or more of the original videos may include video content which has gone viral on the Internet. For example, one of the original videos may include the "Charlie Bit My Finger" video which is the most popular viral video on some video streaming websites.

In some embodiments, one or more of the original videos may include video content featuring a politician or some other public figure or news-worthy individual. For example, one of the original videos may feature Donald Trump, Hillary Clinton or some other public figure or news-worthy individual.

In some embodiments, one or more of the original videos may include video content recorded by a pair of AR glasses which include a camera for recording such videos. The AR glasses include a processor, a non-transitory memory and any software which is necessary to cause the process to record an original video using the camera and then store the original video in the non-transitory memory.

In some embodiments, the database 199 may store replacement videos that are recorded by the video application 103b on the mobile device 115 and transmitted to the video server 101 via the network 105. For example, a user of a smartphone may want to replace a portion of the original video with a portion of the replacement video. For example, the original video may include a popular character and the replacement video may include images including a user 125 of the smartphone, and the user 125 may want to replace their head onto the head of the popular character in the original video. In this example the popular character in the original video may be referred to as a subject or main subject of the original video. In the subsequent description the terms "subject" and "main subject" are used interchangeably.

The subject may include a set of pixels in the original video that may be replaced by pixels in the replacement video. In some embodiments, only a subset of the pixels in the subject are replaced by the pixels from the replacement video (e.g., the head-shaped region).

The mobile devices 115a . . . n (referred to collectively as the "mobile device 115") is a computing device that includes a memory and a hardware processor. For example, the mobile device 115 may be a camera, a laptop computer, a desktop computer, a tablet computer, a smartphone, a wearable device, a pair of AR glasses, a head-mounted display, a mobile email device, a portable game player, a portable music player, a television with one or more processors embedded therein or coupled thereto, or other electronic device capable of accessing a network 105.

In the illustrated implementation, mobile device 115a is coupled to the network 105 via signal line 108 and mobile device 115n is coupled to the network 105 via signal line 110. Signal lines 108 and 110 may be a wired connection, such as Ethernet, coaxial cable, fiber-optic cable, etc., or a wireless connection, such as Wi-Fi, Bluetooth, or other wireless technology. Mobile devices 115a, 115n are accessed by users 125a, 125n, respectively. The mobile devices 115a, 115n in FIG. 1 are used by way of example. While FIG. 1 illustrates two mobile devices, 115a and 115n, the disclosure applies to a system architecture having one or more mobile devices 115.

In some embodiments, the video application 103b may be stored on a mobile device 115. The video application 103 may include a thin-client video application 103b stored on the mobile device 115a and a video application 103a that is stored on the video server 101. For example, the video application 103 may include a mobile application (video application 103b) that runs on the mobile device 115a and records a replacement video of the user. The video application 103b may send the replacement video to the video application 103a stored on the server. The video application 103a may perform operations to replace portions of an original video with portions of the replacement video, and thereby generate a synched video based on the original video and the replacement video.

The original videos may be processed at design time to so that portions of the original videos may be replaced with portions of the replacement videos. This is described above as "pre-processing" the original video. Accordingly, the terms "processing" and "pre-processing" may be used interchangeably in this description.

In some embodiments, the video application 103a (or the video application 103b) may generate a user interface for an administrator that allows the administrator to adjust an adjustable rectangle to identify an orientation of the neck and a vertebra for the neck base for each frame of the original video.

In some embodiments, the video application 103a (or the video application 103b) generate a user interface for the user 125 that allows the user 125 to identify a neck point in a frame of the replacement video. In some embodiments, the user interface may allow the user 125 to correctly capture a replacement image or a replacement video. In some embodiments, the creator of the replacement video positions a camera in such a way that replacement image or video is positioned within the placeholder.

The video application 103a (or the video application 103b) may determine a neck base point in each frame based on the user input. The video application 103a (or the video application 103b) may synch a positioning and orientation of a portion of the replacement video to a positioned subject within the original video.

In some embodiments, the video application 103b may be a standalone application stored on the mobile device 115. The mobile device 115 may include one or more replacement videos to sync with the original video. Alternatively or additionally, the video application 103 may request an original video from the database 199 stored on the video server. The video application 103b on the mobile device 115 may complete the steps described herein with reference to the video application 103a (or the "video application 103b" or the "video application").

In some embodiments, the video application 103 includes code and routines that, when executed by a processor of the mobile device 115 or the video server 101, cause the processor to execute one or more of the steps described below for the methods depicted in FIGS. 3, 3, 13, 15 and 17.

In some embodiments, the video application 103 includes code and routines that, when executed by a processor of the mobile device 115 or the video server 101, cause the processor to generate a synched video based on an original video and a replacement video as described herein.

In some implementations, the video application 103 may be implemented using hardware including a field-programmable gate array (FPGA) or an application-specific integrated circuit (ASIC). In some implementations, the video application 103 may be implemented using a combination of hardware and software.

The video application is described in more detail below with reference to FIGS. 2-18.

In addition to the video application 103b, a mobile device 115 includes one or more of the following elements: an operating system 107; a camera 109; video data 111; and a clock 113.

The operating system 107 includes any operating system which is compatible with the mobile device 115.

The camera 109 includes a hardware camera module which is operable to capture digital images including pictures and videos. For example, the camera 109 captures a replacement video.

The video data 111 is digital data describing the one or more of an original video (e.g., which may be retrieved from the database 199 of the video server 101), a replacement video and a synched video generated based in part on the original video and the replacement video (or a portion of the replacement video).

The clock 113 includes a system clock of the mobile device 115. In some embodiments, the clock 113 generates time values which are included in the timing data (i.e., the MIPD) which is used to omni-synch the original video and the replacement video (or a portion of the replacement video) to generate the synched video.

The third-party server 120 may include a processor, a memory and network communication capabilities. In some embodiments, the third-party server 120 is a hardware server. The third-party server 120 is communicatively coupled to the network 105 via signal line 118. Signal line 118 may be a wired connection, such as Ethernet, coaxial cable, fiber-optic cable, etc., or a wireless connection, such as Wi-Fi, Bluetooth, or other wireless technology. In some embodiments, the third-party server 120 sends and receives data to and from one or more of the mobile devices 115a-115n and the video server 101 via the network 105.

In some embodiments, the third-party server 120 may include any software, data or hardware necessary to provide an electronic image messaging service, a social networking service, video streaming service, messaging service, video sharing service, etc. The third-party server 120 may enable the user 125 to share the synched video generated by the video application 103 with other users 125 of the other mobile devices 115 via the network 105.

In some embodiments, the third-party server 120 provides an electronic image messaging service where users share pictures, videos and messages with one another. The electronic image messaging service may be operable so that the pictures, videos and messages are only available for a limited amount of time before they become inaccessible. For example, a first user may share an synched video with a second user via the electronic image messaging service and the second user is able to view the synched video for a limited amount of time before the synched video becomes inaccessible to the second user.

Figure 2:
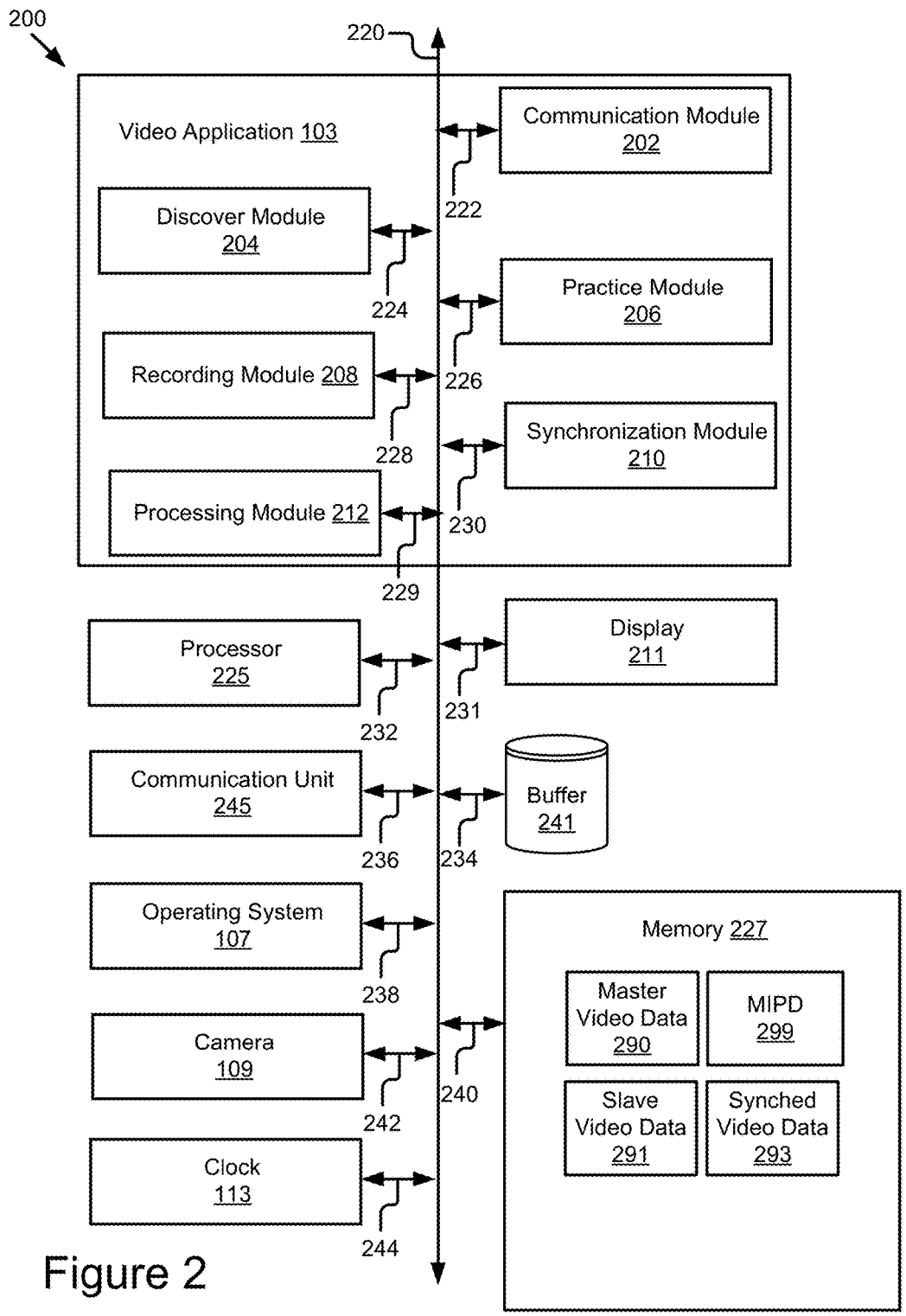
FIG. 2 is a block diagram illustrating an example computer system including the video application according to some embodiments.

Referring now to FIG. 2, depicted is a block diagram illustrating an example computer system 200 including a video application 103 according to some embodiments.

In some embodiments, the computer system 200 may include a special-purpose computer system that is programmed to perform one or more steps of one or more of the methods described below with reference to FIGS. 3, 4, 13, 15 and 17.

In some embodiments, the computer system 200 may be an element of one or more of the video server 101 and the mobile device 115.

In some embodiments, the functionality of the computer system 200 is distributed among the video server 101 and the mobile device 115. For example, some of the elements described below with reference to the computer system 200 are elements of the video application 103a of the video server 101 while other elements described below with reference to the computer system 200 are elements of the video application 103b of the mobile device 115.

The computer system 200 may include one or more of the following elements according to some examples: the video application 103; a processor 225; a display 211; a communication unit 245; a buffer 241; an operating system 107; a camera 109; a clock 113; and a memory 227. The components of the computer system 200 are communicatively coupled by a bus 220.

In the illustrated embodiment, the display 211 is communicatively coupled to the bus 220 via a signal line 231. The processor 225 is communicatively coupled to the bus 220 via a signal line 232. The buffer 241 is communicatively coupled to the bus 220 via a signal line 234. The communication unit 245 is communicatively coupled to the bus 220 via a signal line 236. The operating system 107 is communicatively coupled to the bus 220 via a signal line 238. The memory 227 is communicatively coupled to the bus 220 via a signal line 240. The camera 109 is communicatively coupled to the bus 220 via a signal line 242. The clock 113 is communicatively coupled to the bus 220 via a signal line 244.

The following elements of the computer system 200 were described above with reference to FIG. 1, and so, those descriptions will not be repeated here: the operating system 107; the camera 109; and the clock 113.

The display 211 includes an electronic display that is operable to display visual content. The visual content includes, for example, one or more of the GUIs described here and the video content described herein (e.g., the content of the master video, i.e., master video content, the content of the slave video, i.e., slave video content, and the content of the synched video, e.g., synched video content). The display 211 may be touch sensitive and operable to receive inputs responsive to a finger or some other part of the user's body touching the display 211.

The memory 227 is a non-transitory computer-readable memory. The memory 227 stores instructions or data that may be executed by the processor 225. The instructions or data may include code for performing the techniques described herein. The memory 227 stores any data or information necessary for the video application 103 to provide its functionality. The memory 227 may store any of the data described above with reference to FIG. 1.

In some embodiments, the memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As depicted in FIG. 2, the memory 227 stores the following elements: the master video data 290; slave video data 291; Master Item Positioning Data 299 (herein "MIPD data 299"); and synched video data 293. In some embodiments, the operating system is stored on the memory 227.

The master video data 290 includes digital data describing a master video. As used herein, the terms "master video" and "original video" are interchangeable. The master video data 290 is sourced from the database of the video server described above with reference to FIG. 1. For example, a user of a mobile device previews one or more master videos using a discover GUI generated by the video application, selects a master video from a video library included in the database, and the mobile device receives master video data 290 that describes the selected master video.

The slave video data 291 includes digital data describing a slave video. As used herein, the terms "slave video" and "replacement video" are interchangeable. For example, during the "Recording Mode" the recording GUI includes a head-shaped region which depicts live video content captured by the camera 109. This live video is an example of a slave video. The display 211 depicts the recording GUI which includes the master video with the head of the main subject of the master video replaced by the head-shaped region which depicts the slave video. The video application 103 causes the processor 225 to record slave video data 291 describing this slave video, i.e., the pixels depicted in the head-shaped region during the recording mode.

The MIPD 299 includes digital data describing any data which is necessary to omni-synch a particular slave video to a particular master video.

In some embodiments, MIPD 299 describes synchronized time values shared by particular frames of the master video and particular frames of the slave video. For example, the slave video includes frames that were depicted in the head-shaped region of the recording GUI during particular frames of the master video. The MIPD 299 includes one or more synchronized time values (e.g., a place in time for the duration of the master video) and data describing, for each frame of the master video, which frame of the slave video was depicted in head-shaped region of the recording GUI while that particular frame of the master video was depicted in the recording GUI. In this way the timing data enables the slave video to be omni-synched to the master video.

In some embodiments, the MIPD 299 describes the timing of the replacement video (i.e., the slave video) relative to the timing of the original video (i.e., the master video) so that these two types of video content can be subsequently be omni-synched to form a new video (i.e., the synched video).

An example of the MIPD 299 is depicted in FIG. 9 according to some embodiments. The MIPD 299 is described in more detail below with reference to FIG. 9 according to some embodiments. An example of the video application determining an example of the MIPD 299 is depicted in FIGS. 10-12 according to some embodiments.

The synched video data 293 includes digital data that describes the synched video which is generated by the video application 103 based on the master video data 290, the slave video data 291 and the MIPD 299.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer ("CISC") architecture, a reduced instruction set computer ("RISC") architecture, or an architecture implementing a combination of instruction sets. Although FIG. 2 includes a single processor 225, multiple processors may be included. Other processors, operating systems, sensors, displays, and physical configurations may be possible.

The communication unit 245 transmits and receives data to and from a network 105 or to another communication channel. In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including: IEEE 802.11; IEEE 802.16, BLUETOOTH®; or another suitable wireless communication method.

In some embodiments, the communication unit 245 includes a cellular communications transceiver for sending and receiving data over a cellular communications network including via short messaging service ("SMS"), multimedia messaging service ("MMS"), hypertext transfer protocol ("HTTP" or "HTTPS" if the secured implementation of HTTP is used), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The buffer 241 is a non-transitory computer-readable memory. The buffer 241 stores instructions or data that may be executed by the processor 225. The instructions or data may include code for performing the techniques described herein. The buffer 241 stores any data or information necessary for the video application 103 to provide its functionality. The buffer 241 may store any of the data described above with reference to the memory 227.

In some embodiments, the buffer 241 may be an DRAM device, an SRAM device, flash memory, or some other memory device. In some embodiments, the buffer 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

One or more of the buffer 241 or the memory 227 includes graphical data for generating one or more of the GUIs described herein.

In the illustrated embodiment shown in FIG. 2, the video application 103 includes: a communication module 202; a discover module 204; a practice module 206; a recording module 208; a synchronization module 210; and processing module 212.

The communication module 202 can be software including routines for handling communications between the video application 103 and other components of the computer system 200. In some embodiments, the communication module 202 can be a set of instructions executable by the processor 225 to provide the functionality described below for handling communications between the video application 103 and other components of the computer system 200.

The communication module 202 sends and receives data, via the communication unit 245, to and from one or more elements of the operating environment 100. For example, the communication module 202 receives the master video data 290 via the communication unit 245. The communication module 202 may send or receive any of the data or messages described above with reference to FIG. 1 or below with reference to the methods described herein.

In some embodiments, the communication module 202 receives data from components of the video application 103 and stores the data in the memory 227 (or the buffer 241). For example, the communication module 202 receives any of the data described herein and stores this data in the memory 227.

In some embodiments, the communication module 202 may handle communications between components of the video application 103.

In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The discover module 204 can be software including routines for providing the functionality of the video application 103 during the "Discover Mode." For example, the discover module 204 generates the discover GUI, receives the selection of a master video from the video library, works with the communication module 202 to retrieve the master video data 290 and provide the master video data 290 to the practice module 206.

In some embodiments, the discover module 204 can be stored in the memory 227 of the computer system 200 and can be accessible and executable by the processor 225. The discover module 204 may be adapted for cooperation and communication with the processor 225 and other components of the computer system 200 via signal line 224.

The practice module 206 can be software including routines for providing the functionality of the video application 103 during the "Practice Mode." For example, the practice module 206 generates the practice GUI and provides the functionality of the video application 103 described above with reference to the practice GUI and the "Practice Mode."

In some embodiments, the practice module 206 can be stored in the memory 227 of the computer system 200 and can be accessible and executable by the processor 225. The practice module 206 may be adapted for cooperation and communication with the processor 225 and other components of the computer system 200 via signal line 226.

The recording module 208 can be software including routines for providing the functionality of the video application 103 during the "Recording Mode." For example, the recording module 208 generates the recording GUI and provides the functionality of the video application 103 described above with reference to the recording GUI and the "Recording Mode." The recording module 208 also analyzes the recording processes and generates the MIPD 299.

In some embodiments, the recording module 208 can be stored in the memory 227 of the computer system 200 and can be accessible and executable by the processor 225. The recording module 208 may be adapted for cooperation and communication with the processor 225 and other components of the computer system 200 via signal line 228.

The synchronization module 210 can be software including routines for providing the functionality of the video application 103 for generating the synched video and providing the functionality of the video application 103 during the "Confirmation Mode." For example, the synchronization module 210 generates the confirmation GUI and provides the functionality of the video application 103 described above with reference to generating the synched video data 293 and functionality described above with reference to the confirmation GUI and the "Confirmation Mode."

In some embodiments, the synchronization module 210 can be stored in the memory 227 of the computer system 200 and can be accessible and executable by the processor 225. The synchronization module 210 may be adapted for cooperation and communication with the processor 225 and other components of the computer system 200 via signal line 230.

The processing module 212 can be software including routines for pre-processing the original videos. For example, the processing module 212 analyzes an original video (e.g., a clip) to generate the head-shaped region for one or more frames of the original video. In some embodiments, the processing module 212 includes code and routines that are operable, when executed by the processor 225, to cause the processor 225 to execute the functionality described below with reference to FIG. 7.

In some embodiments, the processing module 212 can be stored in the memory 227 of the computer system 200 and can be accessible and executable by the processor 225. The processing module 212 may be adapted for cooperation and communication with the processor 225 and other components of the computer system 200 via signal line 229.

Figure 3:
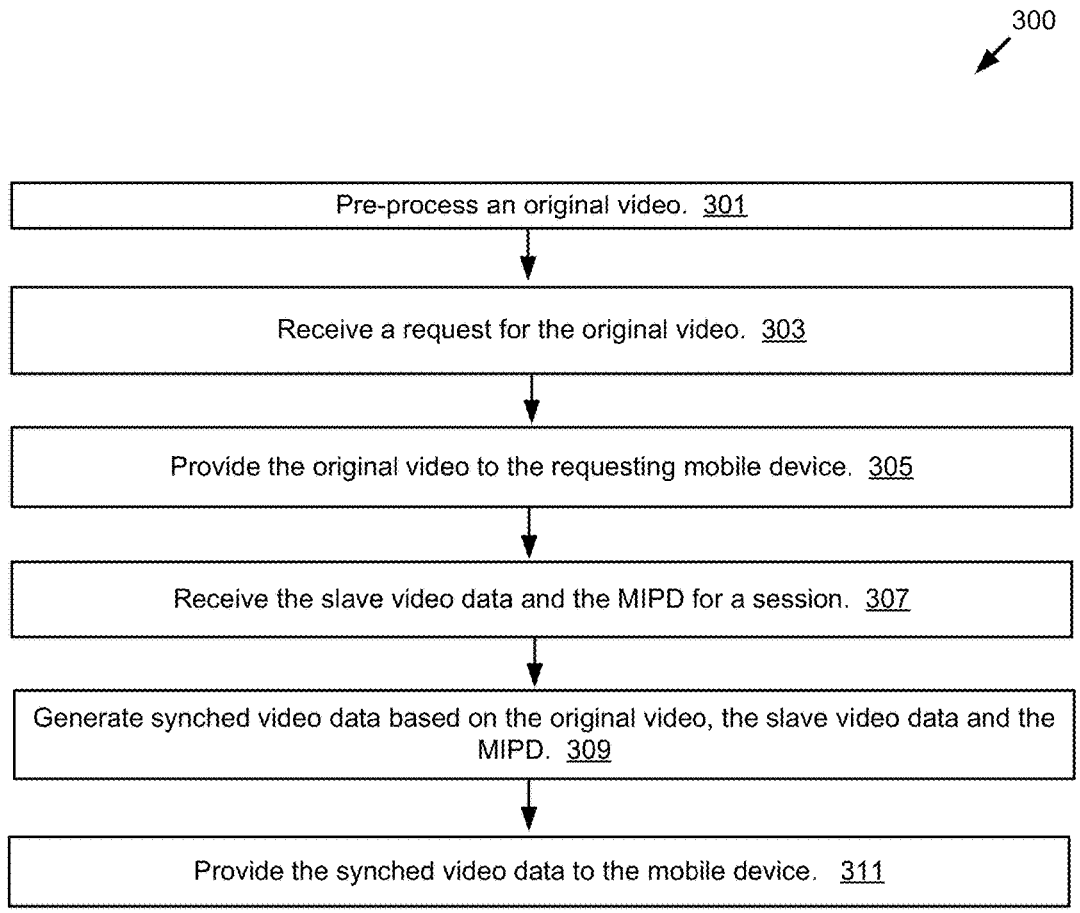
FIG. 3 includes a flowchart of an example method for generating an synched video according to some embodiments.

Referring now to FIG. 3, depicted is a flowchart of an example method 300 for generating an synched video according to some embodiments. One or more of the steps of the method 300 are executed by the video application. For example, the video application includes code and routines that are operable, when executed by the processor, to cause the processor to execute one or more steps of the method 300. In some embodiments, some steps of the method 300 are executed by a video application of a mobile device while others are executed by a video application of the video server. The steps of the method 300 may be executed any in order. In some embodiments, one or more steps of the method 300 are not executed while others are executed.

At step 301, an original video is pre-processed. At step 303, a request for an original video is received. As used herein, the term "original video" may include a clip from the original video. The request may be received responsive to a user making a selection using a discover GUI displayed on their mobile device.

At step 305, the selected original video is provided to the requesting mobile device. This may include, for example, the video application of the video server transmitting master video data to the video application of the mobile device via a network.

At step 307, slave video data and MIPD are received for a session. For example, the user may have selected the "SAVE" button depicted by the confirmation GUI which is displayed by their mobile device, which in turn causes the video application of their mobile device to transmit the slave video data and the MIPD to the video server as described at step 307. The data included at step 307 may include the master video data for the original video transmitted at step 305 as well, or an indication of the original video (e.g., a file name for the master video data that describes the original video) since the video server already stores the original video.

At step 309, a synched video is generated based on the slave video data, the original video data of step 305 and the MIPD. The synched video is described by synched video data.

At step 311, the synched video data is provided to the mobile device via the network.

Figure 4:
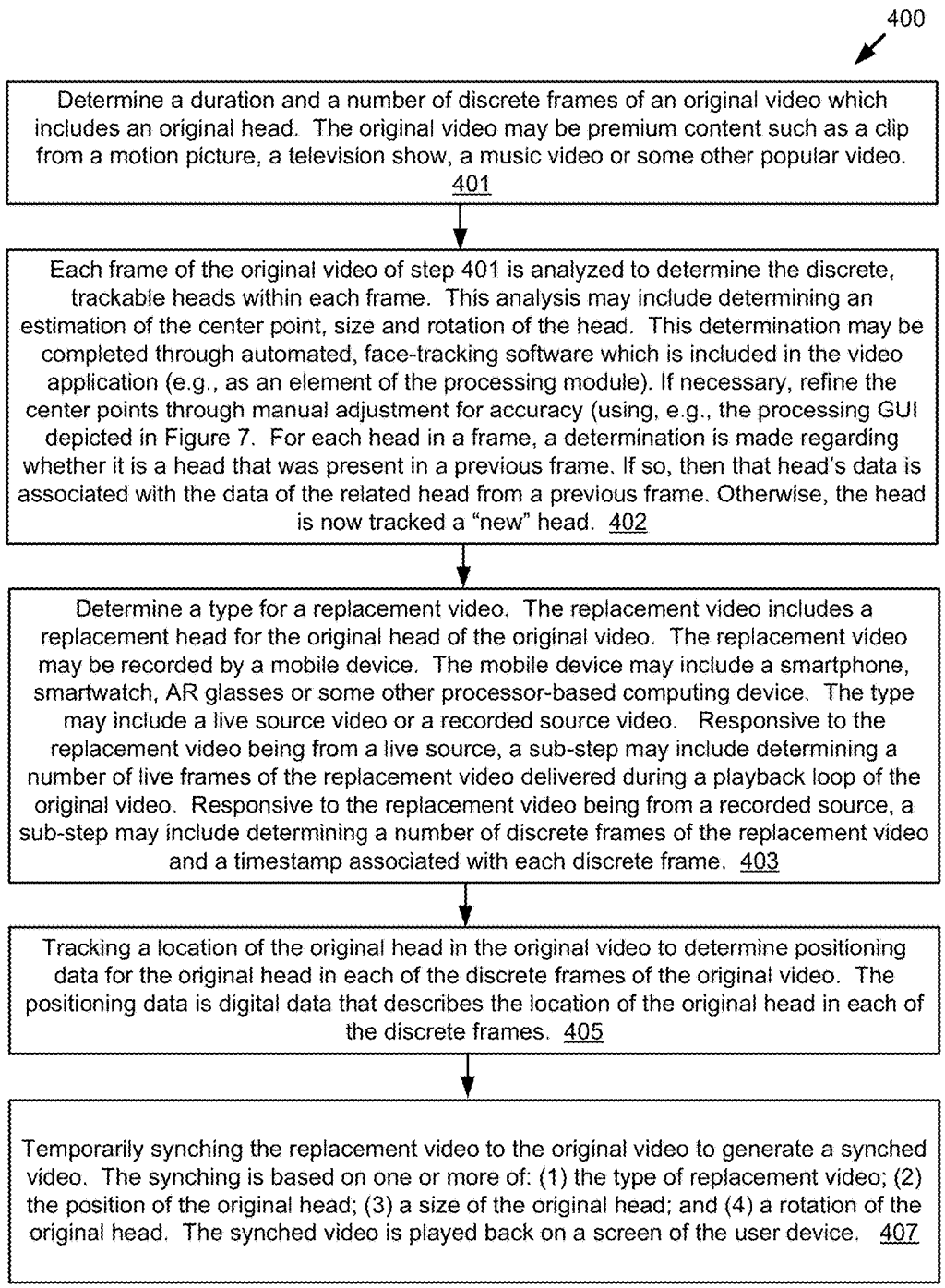
FIG. 4 includes a flowchart of an example method for providing playback of a synched video that is personalized for a user of a mobile device according to some embodiments.

Referring now to FIG. 4, depicted is a flowchart of an example method 400 for providing playback of a synched video that is personalized for a user of a mobile device according to some embodiments. One or more of the steps of the method 400 are executed by the video application. For example, the video application includes code and routines that are operable, when executed by the processor, to cause the processor to execute one or more steps of the method 400. In some embodiments, some steps of the method 400 are executed by a video application of a mobile device while others are executed by a video application of the video server. The steps of the method 400 may be executed any in order. In some embodiments, one or more steps of the method 400 are not executed while others are executed.

At step 401, a duration and a number of discrete frames of an original video which includes an original head is determined.

At step 402, each frame of the original video of step 401 is analyzed to determine the discrete, trackable heads within each frame. This analysis may include determining an estimation of the center point, size and rotation of the head. This determination may be completed through automated, face-tracking software which is included in the video application (e.g., as an element of the processing module). If necessary, refine the center points through manual adjustment for accuracy (using, e.g., the processing GUI depicted in FIG. 7. For each head in a frame, a determination is made regarding whether it is a head that was present in a previous frame. If so, then that head's data is associated with the data of the related head from a previous frame. Otherwise, the head is now tracked a "new" head.

At step 403, a type for a replacement video is determined. The replacement video includes a replacement head for the original head of the original video. The replacement video may be recorded by a mobile device. The type may include a live source video or a recorded source video. A live source video is one which is recorded by the mobile device in real-time or as a live stream. A recorded source video is one which was previously recorded in stored in a memory of the mobile device or accessible by the mobile device (e.g., via a cloud drive which may be provided by the third-party server).

Responsive to the replacement video being from a live source, a sub-step of step 403 may include determining a number of live frames of the replacement video delivered during a playback loop of the original video.

Responsive to the replacement video being from a recorded source, a sub-step of step 403 may include determining a number of discrete frames of the replacement video and a timestamp associated with each discrete frame.

At step 405, a location of the original head in the original video is tracked to determine positioning data for the original head in each of the discrete frames of the original video. The positioning data is digital data that describes the location of the original head in each of the discrete frames.

At step 407, the replacement video is temporarily synched to the original video to generate a synched video. The synching is based on one or more of: (1) the type of replacement video; (2) the position of the original head; (3) a size of the original head; and (4) a rotation of the original head. The synched video is played back on a screen of the user device (e.g., the display described above for FIG. 2).

Referring now to FIG. 5A, depicted is an example discover GUI 505. In this example, a user may select an original video from the list of videos that the video application will add the user's head onto. The video application includes code and routines that are operable, when executed by the processor, to cause the processor to generate the discover GUI 505 and display the discover GUI 505 on an electronic display of the mobile device. The discover GUI 505 is operable to receive touch-based inputs via the electronic display. For example, a user selects an original video (i.e., a master video) via the discover GUI 505.

Referring now to FIG. 5B, depicted is an example practice GUI 510 in which the head-shaped region is not occupied by slave video content. For example, the depicted embodiment of the practice GUI 510 includes master video content but not the slave video content. The video application includes code and routines that are operable, when executed by the processor, to cause the processor to generate the practice GUI 510 and display the practice GUI 510 on an electronic display of the mobile device. The practice GUI 510 is operable to receive touch-based inputs via the electronic display. For example, a user selects an graphical "START" button via the practice GUI 510.

Referring now to FIG. 5C, depicted is an example practice GUI 515 in which the head-shaped region is occupied by slave video content. The depicted embodiment of the practice GUI 515 includes master video content and also slave video content. In some embodiments, the slave video content is live video content captured by a camera of the mobile device. The video application includes code and routines that are operable, when executed by the processor, to cause the processor to generate the practice GUI 515 and display the practice GUI 515 on an electronic display of the mobile device. The practice GUI 515 is operable to receive touch-based inputs via the electronic display. For example, a user selects an graphical "START" button via the practice GUI 515.

Comparing FIG. 5C to FIG. 5B demonstrates an example of how the video application replaces the head of a main subject of an original video with the head of a user of the mobile device as provided by the slave video.

Referring now to FIG. 6A, depicted is an example of a recording GUI 605 at a first frame. Note the orientation and size of the head included in the slave video content included in the head-shaped region of the recording GUI 605. The orientation and size of the head in the first frame of the recording GUI 605 will be referenced again below in the description for FIG. 6B.

Referring now to FIG. 6B, depicted is an example of a recording GUI 610 at a second frame. The second frame of the recording GUI 610 occurs immediately following the first frame of the recording GUI 605. Note the orientation and size of the head included in the slave video content included in the head-shaped region of the recording GUI 610. A comparison of this recording GUI 610 of FIG. 6A relative to the recording GUI 605 of FIG. 6B illustrates an example of how the video application accounts for modifications in head size and rotational orientation.

For example, note that in the second frame of FIG. 6B the head-shaped area has increased in size and changed in orientation relative to the first frame of FIG. 6A by being tilted down and to the right relative to the first frame of FIG. 6A. In FIG. 6B the video application has accounted for these changes by modifying the size and rotational-orientation of the head-shaped region in the second frame depicted in FIG. 6B relative to the size and rotational-orientation of the head-shaped region in the first frame depicted in FIG. 6A. Note that the user does not have to manually tilt his head down and to the right in the second frame relative to the first frame. Instead, the video application includes code and routines that are operable, when executed by the processor, to cause the processor to make this modification automatically by: (1) changing the rotational-orientation of the head-shaped region during pre-processing of the clip from the original video, an example of which is depicted in FIG. 7; and (2) modifying the size and rotational-orientation of the slave video content in real-time (or substantially real-time) to be consistent with size and rotational-orientation of the head-shaped region as determined during pre-processing.

Referring now to FIG. 6C, depicted is an example of a confirmation GUI 615. Note the orientation and size of the head included in the slave video content included in the head-shaped region of the recording GUI 605. The orientation and size of the head in the first frame of the recording GUI 605 will be referenced again below in the description for FIG. 6B.

Referring now to FIG. 7, depicted is an example of a processing GUI 705 generated by the video application and configured to enable an administrator of the video server to identify a neck point in a frame of an original video. In some embodiments, the identification of the neck point is an element of the pre-processing which occurs at design time. The processing GUI 705 is also operational to enable the administrator to define the head-shaped region 710 within each frame of the original video that include the main subject for this particular video.

The head of the main subject may be referred to herein as the "original head." In the synched video the original head is replaced by the slave video content, which may include a "replacement head." In some embodiments, the replacement head includes a head of the user of the mobile device which is included in a replacement video. In other embodiments, the replacement head included in the replacement video is not the head of the user of the mobile device. For example, the replacement head is the head of some other individual or an object or anything else. In some embodiments, the user is using a device other than a mobile device. For example, the user is using any processor-based computing device that is not a mobile device and includes a camera and any software or hardware necessary to generating a video recording such as the replacement video.

Element 715 is the head base point of the original head. The head base point is determined by one or more facial recognition algorithms which are included in the processing module of the video application. The head base point may be automatically determined by the processing module.

Element 720 is the neck point of the original head. The neck point is manually selected by the administrator of the video server using the processing GUI 705.

The neck point and the head base point form a line segment. This line segment is used by the processing algorithm to track the placement, rotation and size of the original head within the original video. These variables are recorded for each frame of the original video and used later to (1) determine the head-shaped region and (2) adjust the placement, rotation and size of the slave video which is depicted in the head-shaped region at run time. For example, if the line segment gets bigger from frame-to-frame, then the head-shaped region gets bigger from frame-to-frame as well. The relative size of the line segment from frame-to-frame can be tracked, and this relative size can be used to adjust the size of the head-shaped and or the size (or zoom value) of the slave video displayed in the head-shape region during the Recording Mode (or the Practice Mode). The line segment can similarly be used to modify the placement and rotational-orientation in of the head-shaped region and/or the slave video content in real-time (or substantially real-time).

Referring now to FIG. 8A, depicted is a block diagram illustrating an example frame structure 800 of a master video.

Referring now to FIG. 8B, depicted is a block diagram illustrating an example frame structure 805 of a slave video from a live source.

Referring now to FIG. 8C, depicted is a block diagram illustrating an example frame structure 810 of a slave video from a recorded source.

Referring now to FIG. 9, depicted is a block diagram illustrating an example of the MIPD 299.

Referring now to FIG. 10, depicted is a block diagram illustrating an example process flowchart 1000 describing a relationship between a master video and a slave video over the course of a plurality of frames.

Referring now to FIG. 11, depicted is includes a block diagram illustrating an example process flowchart 1100 describing how the video application tracks a position of a main subject's head as it moves as the positioned item within a master video over the course of a plurality of frames of the master video.

Referring now to FIG. 12, depicted is a block diagram illustrating an example process flowchart 1200 describing how the video application generates MIPD data corresponding to the example depicted in FIG. 11.

Figure 13:
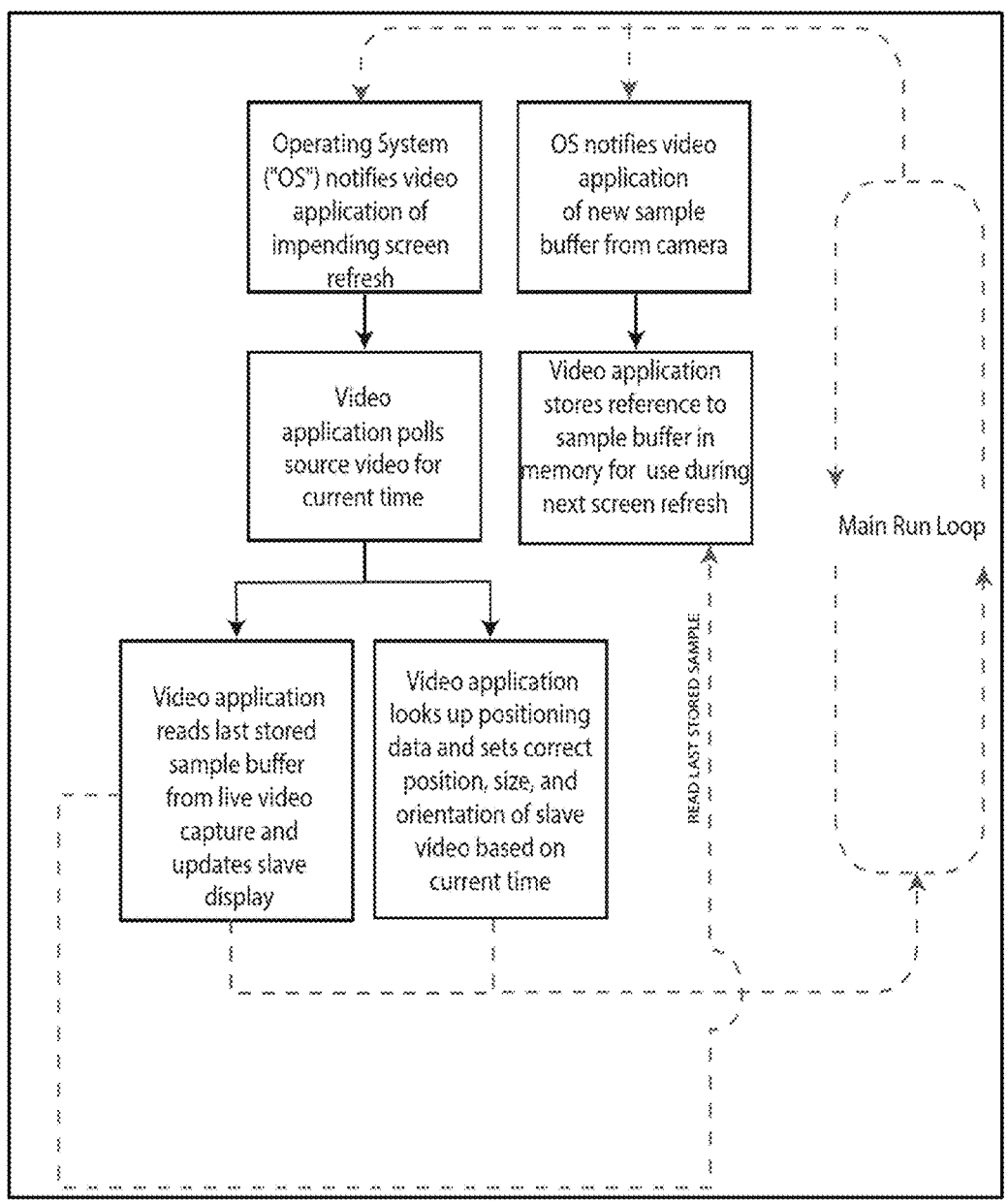
FIG. 13 includes a flowchart of an example method for displaying a live slave video source omni-synched to a master video source according to some embodiments.

Referring now to FIG. 13, depicted is a flowchart of an example method 1300 for the video application to display a live slave video source omni-synched to a master video source. One or more of the steps of the method 1300 are executed by the video application. For example, the video application includes code and routines that are operable, when executed by the processor, to cause the processor to execute one or more steps of the method 1300. In some embodiments, some steps of the method 1300 are executed by a video application of a mobile device while others are executed by a video application of the video server. The steps of the method 1300 may be executed any in order. In some embodiments, one or more steps of the method 1300 are not executed while others are executed.

Figure 14:
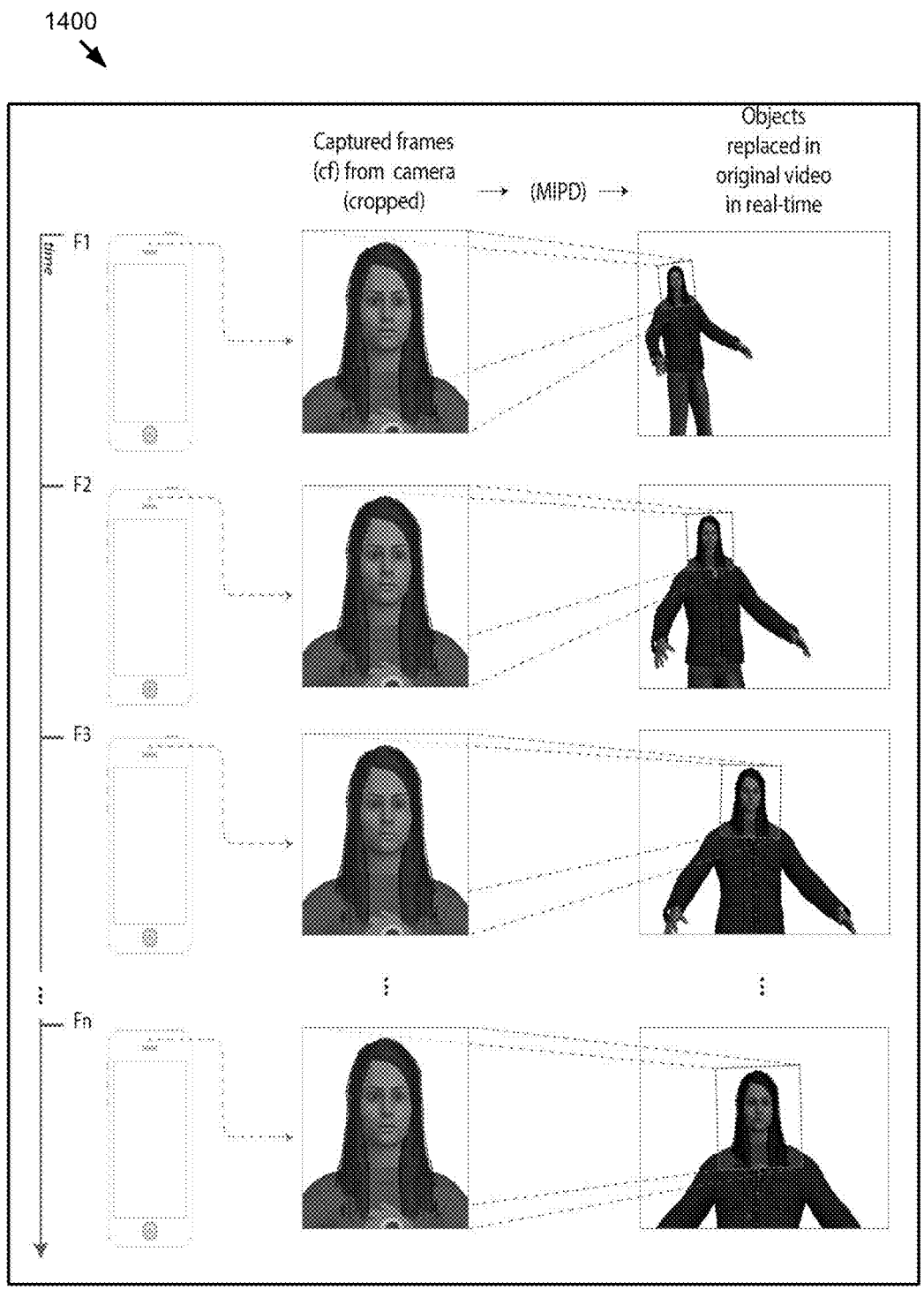
FIG. 14 includes a block diagram depicting an example process flowchart describing how the video application omni-synchs a live slave video source to a master video source according to some embodiments.

Referring now to FIG. 14, depicted is a block diagram depicting an example process flowchart 1400 describing how the video application omni-synchs a live slave video source to a master video source.

Figure 15:
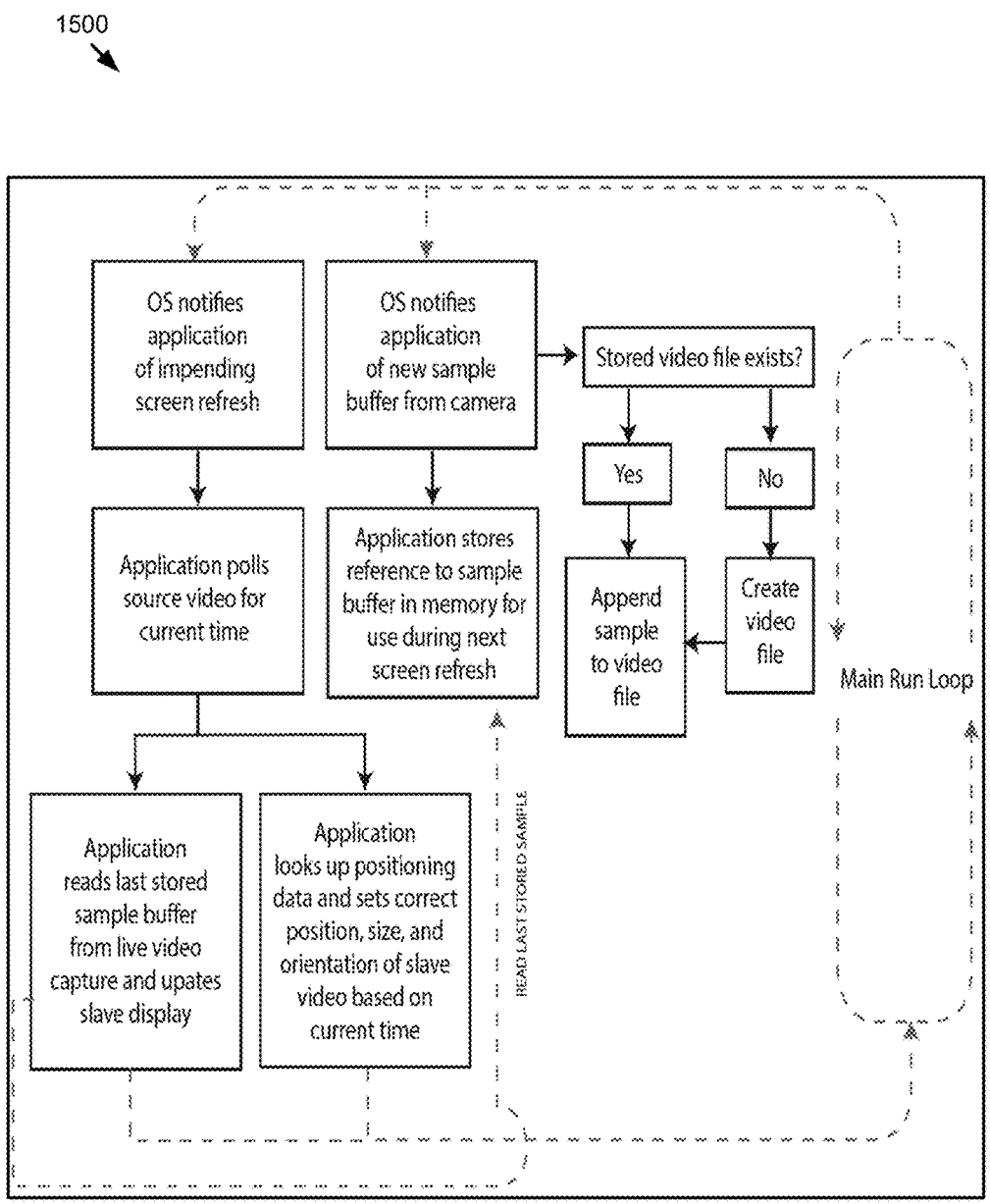
FIG. 15 includes a flowchart of an example method for displaying a live slave video source omni-synced to a master video source while capturing the live stream to disk according to some embodiments.

Referring now to FIG. 15, depicted is a flowchart of an example method 1500 for displaying a live slave video source omni-synced to a master video source while capturing a live stream to disk (e.g., a non-transitory memory). One or more of the steps of the method 1500 are executed by the video application. For example, the video application includes code and routines that are operable, when executed by the processor, to cause the processor to execute one or more steps of the method 1500. In some embodiments, some steps of the method 1500 are executed by a video application of a mobile device while others are executed by a video application of the video server. The steps of the method 1500 may be executed any in order. In some embodiments, one or more steps of the method 1500 are not executed while others are executed.

Figure 16:
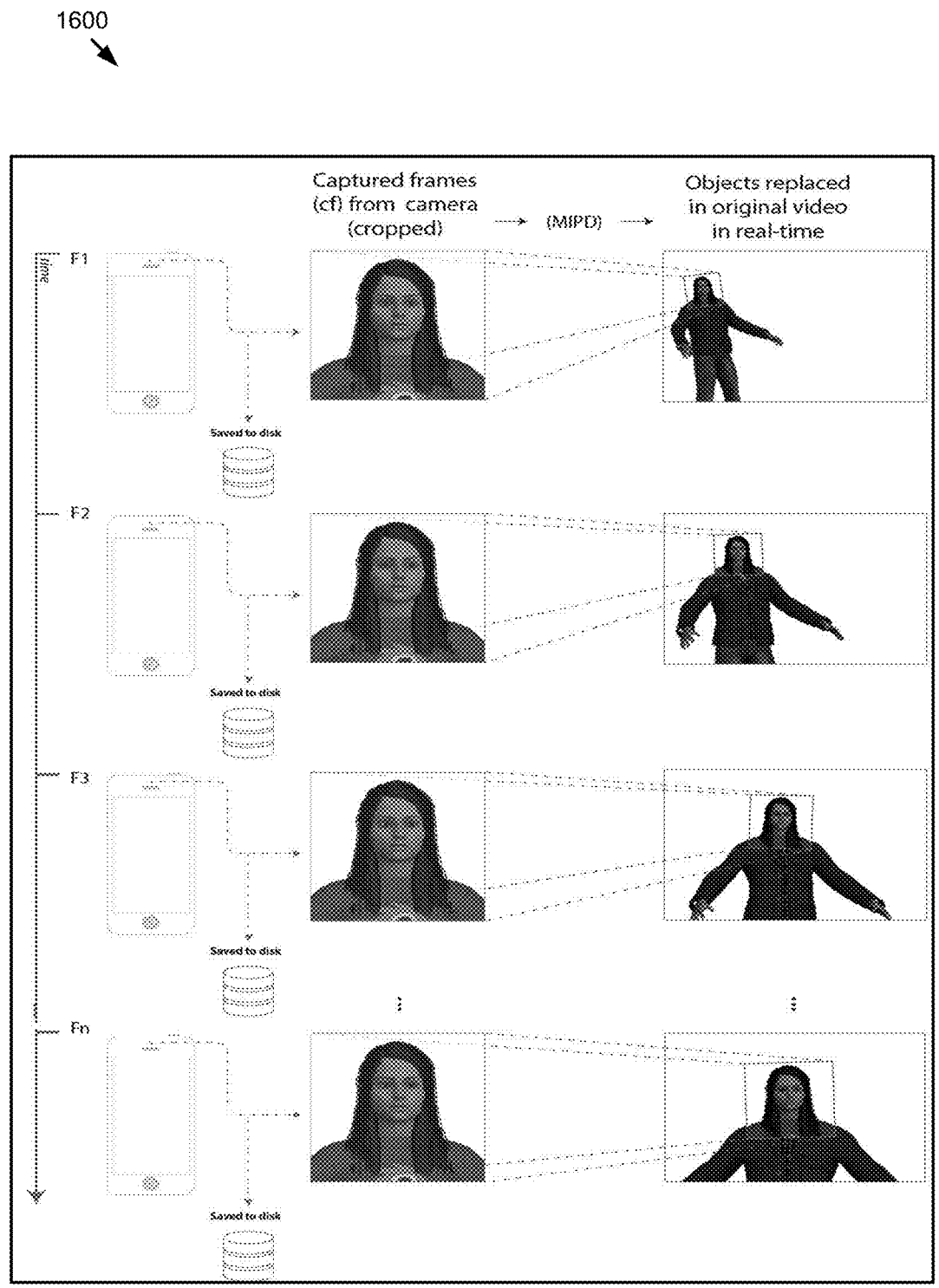
FIG. 16 includes a block diagram depicting an example process flowchart describing how the video application omni-synchs a live slave video source to a master video source while capturing the live stream to disk.

Referring now to FIG. 16, depicted is a block diagram depicting an example process flowchart 1600 describing how the video application omni-synchs a live slave video source to a master video source while capturing the live stream to disk (e.g., a non-transitory memory).

Figure 17:
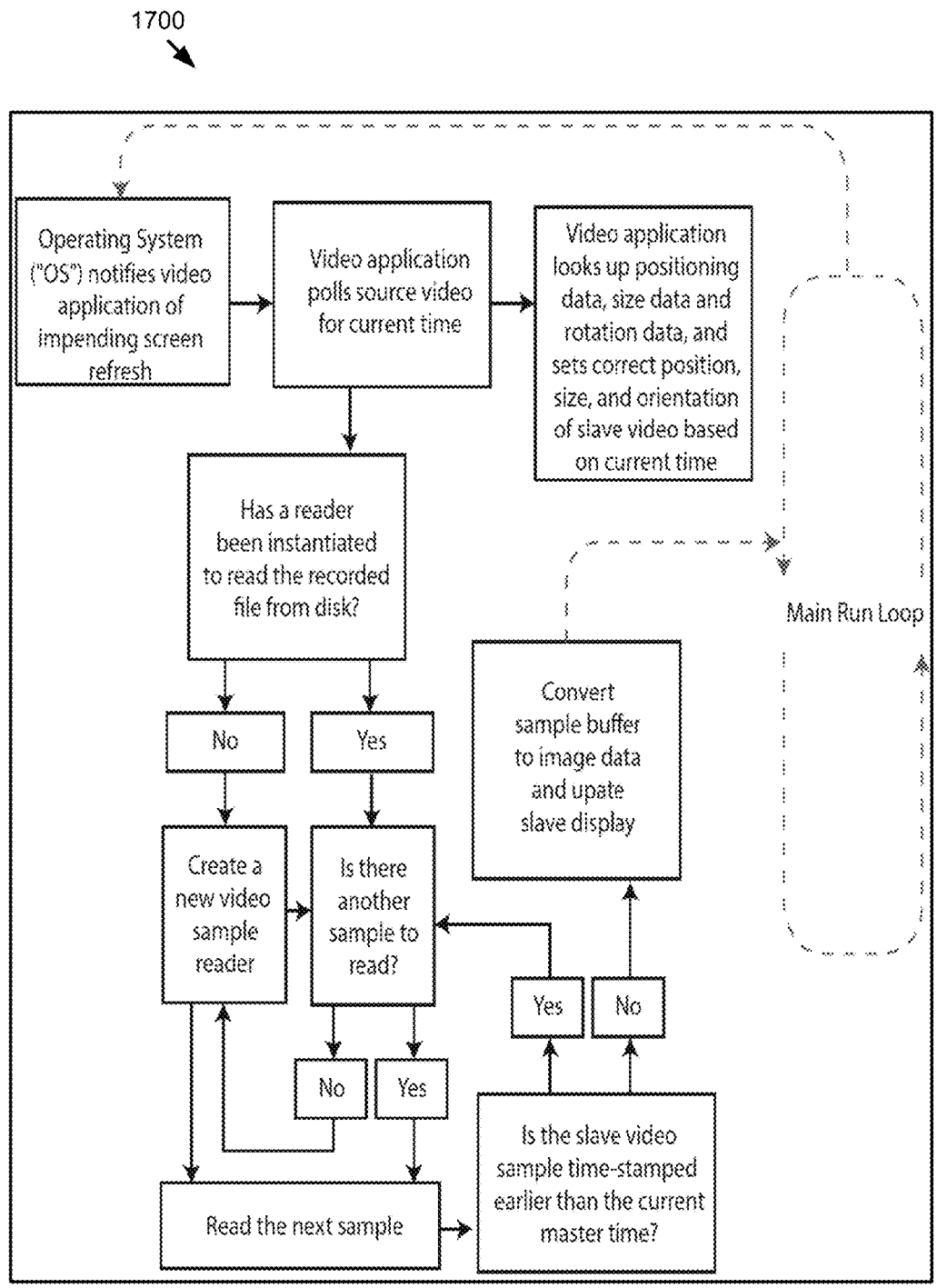
FIG. 17 includes a flowchart of an example method for displaying a recorded slave video source omni-synced to a master video source according to some embodiments.

Referring now to FIG. 17, depicted is a flowchart of an example method 1700 for displaying a recorded slave video source omni-synced to a master video source. One or more of the steps of the method 1700 are executed by the video application. For example, the video application includes code and routines that are operable, when executed by the processor, to cause the processor to execute one or more steps of the method 1700. In some embodiments, some steps of the method 1700 are executed by a video application of a mobile device while others are executed by a video application of the video server. The steps of the method 1700 may be executed any in order. In some embodiments, one or more steps of the method 1700 are not executed while others are executed.

Figure 18:
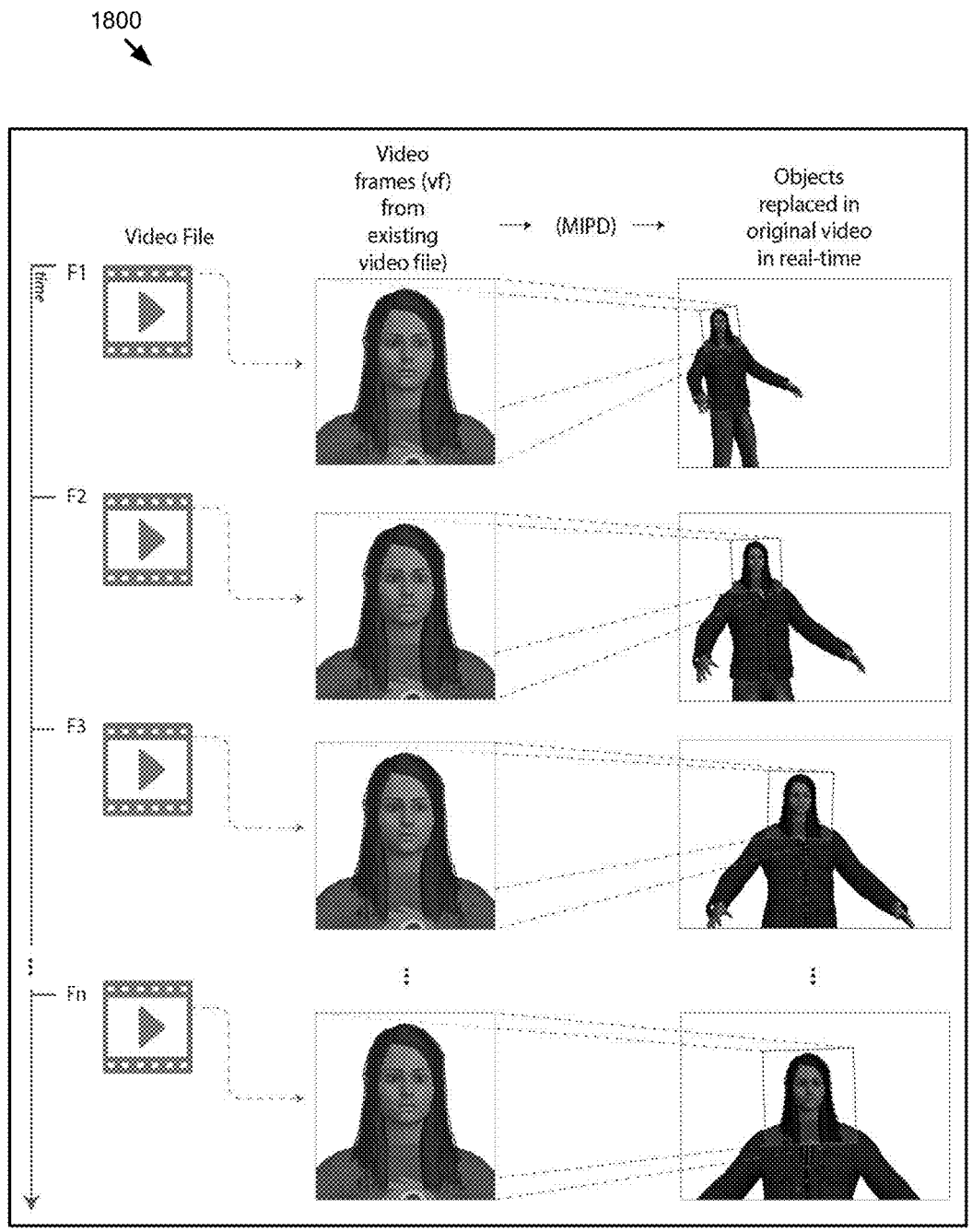
FIG. 18 includes a block diagram depicting an example process flowchart describing how the video application omni-synchs a recorded slave video source to a master video source.

Referring now to FIG. 18, depicted is a block diagram depicting an example process flowchart 1800 describing how the video application omni-synchs a recorded slave video source to a master video source.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "In some embodiments" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method for generating a synched video by a mobile device, the method comprising:

displaying, by the mobile device, a discover graphical user interface (GUI) visually depicting an original video which is available for generating the synched video, wherein at a design time each frame of the original video is pre-processed to identify one or more frames of the original video that include a main subject, wherein the pre-processing includes identifying a head-shaped region in each frame of the original video that includes an original head of the main subject, wherein the original video includes a plurality of frames and the original head varies by one or more of placement, rotation and size from frame-to-frame within plurality of frames of the original video and the pre-processing modifies the original video so that the head-shaped region varies from frame-to-frame within the plurality of frames to match the frame-to-frame variation of the original head within the plurality of frames for one or more of placement, rotation and size;

displaying, by the mobile device, a practice GUI visually depicting the original video with the original head entirely removed from the head-shaped region and replaced by a live video stream recorded by a camera of the mobile device, wherein the live video stream is displayed in the head-shaped region of the original video and visually depicts a replacement head of the user, wherein the practice GUI plays the original video on a loop which ends when a user of the mobile device provides an input to the mobile device triggering the loop to end;

displaying, by the mobile device, a recording GUI visually depicting the original video with the original head entirely removed from the head-shaped region and replaced by the live video stream which is displayed in the head-shaped region of the original video and visually depicts the replacement head, wherein the recording GUI plays the original video once while the recording GUI is displayed, wherein the live video stream is recorded to generate a replacement video that includes the live stream video displayed in the head-shaped region of the recording GUI and not the practice GUI; and omni-synching the original video and the replacement video to generate the synched video, wherein the synched video visually depicts the plurality of frames of the original video with the original head is replaced by the replacement video which visually depicts the replacement head so that the synched video visually depicts the replacement head as a replacement for the original head, wherein the replacement head visually depicted in the synched video varies from frame-to-frame within the plurality of frames to match the frame-to-frame variation of the original head within the plurality of frames of the original video for one or more of placement, rotation and size.

2. A method for generating a synched video, the method comprising:

displaying, by an electronic display, a discover graphical user interface (GUI) visually depicting an original video which is available for generating the synched video, wherein each frame of the original video is analyzed to identify one or more frames of the original video that include a main subject having an original head, wherein the analysis includes identifying a head-shaped region in each frame of the original video that includes the original head, wherein the original video includes a plurality of frames and the original head varies by one or more of placement, rotation and size from frame-to-frame within plurality of frames of the original video and the analyzes modifies the original video so that the head-shaped region varies from frame-to-frame within the plurality of frames to match the frame-to-frame variation of the original head within the plurality of frames for one or more of placement, rotation and size;

displaying, by the electronic display, a recording GUI visually depicting the original video with the original head removed from the head-shaped region and replaced by a video stream which is displayed in the head-shaped region of the original video, wherein the video stream visually depicts a replacement head, wherein the video stream is recorded during a playback of the original video to generate a replacement video that includes the live stream video displayed in the head-shaped region of the recording GUI; and omni-synching the original video and the replacement video to form a synched video, wherein the synched video visually depicts the plurality of frames of the original video with the original head is replaced by the replacement video which visually depicts the replacement head so that the synched video visually depicts the replacement head as a replacement for the original head, wherein the replacement head visually depicted in the synched video varies from frame-to-frame within the plurality of frames to match the frame-to-frame variation of the original head within the plurality of frames of the original video for one or more of placement, rotation and size.

3. The method of claim 2, wherein the electronic display is an element of a smartphone.

4. The method of claim 2, wherein the electronic display is not an element of a smartphone.

5. The method of claim 2, wherein the original video is recorded by a pair of augmented reality glasses that include a processor and a camera for generating the recorded video.

6. The method of claim 2, wherein the original video if of a type selected from a group that includes: a movie; a music video; an episode of a televisual program; virtual reality video content; and augmented reality video content.

7. The method of claim 2, wherein the replacement video is at least one of (1) live stream video content and (2) pre-recorded video content, wherein if the replacement video is live stream video content then the replacement video is not pre-recorded video content and if the replacement video is pre-recorded video content then the replacement video is not live stream video content.

8. The method of claim 2, wherein the replacement video is retrieved from a non-transitory memory.

9. The method of claim 2, wherein the original video is streamed from a video server via a wireless network.

10. The method of claim 2, wherein the replacement video is recorded by a camera of a mobile device that executes the steps of the method and includes the electronic display.

11. The method of claim 2, wherein the replacement video is not wirelessly streamed via a network.

12. The method of claim 2, wherein the steps of the method are executed by a processor responsive to the processor executing software that is operable to cause the processor to execute the steps of the method.

13. The method of claim 2, further comprising a first user sharing the synched video with a second user via an electronic image messaging service.

14. The method of claim 13, wherein the electronic image messaging service is operable so that the synched video is viewable by the second user for a limited amount of time before the synched video becomes inaccessible to the second user.

15. A method for generating a synched video, the method comprising:
- determining a duration and a number of discrete frames of an original video;
- determining a type of replacement video that includes a live source or a recorded source;
- tracking a location of an original head in the original video to determine positioning data for the original head in each of the discrete frames; and
- synching the replacement video to the original video based on a position, a size and a rotation between the original head in the original video and a replacement head in the replacement video, wherein the synching generates a synched video which synchs the replacement head to the original head based on the position, the size and the rotation.

16. The method of claim 15, wherein responsive to the replacement video being from the live source, determining a number of live frames of the replacement video delivered during a playback loop of the original video.

17. The method of claim 15, wherein responsive to the replacement video being from the recorded source, determining a number of discrete frames and a timestamp associated with each discrete frame.

18. The method of claim 15, wherein the replacement video is captured on a mobile device.

19. The method of claim 15, wherein a creator of the replacement video positions a camera in such a way that replacement image or video is positioned within a head-shaped region included in the original video and overlaying the original head.

20. The method of claim 15, further comprising a first user sharing the synched video with a second user via an electronic image messaging service which is operable so that the synched video is viewable by the second user for a limited amount of time before the synched video becomes inaccessible to the second user.

* * * * *